US010896536B2

(12) United States Patent
Croxford et al.

(10) Patent No.: US 10,896,536 B2
(45) Date of Patent: Jan. 19, 2021

(54) PROVIDING OUTPUT SURFACE DATA TO A DISPLAY IN DATA PROCESSING SYSTEMS

(71) Applicant: Arm Limited, Cambridge (GB)

(72) Inventors: Daren Croxford, Cambridge (GB); Sharjeel Saeed, Cambridge (GB); Jayavarapu Srinivasa Rao, Cambridge (GB); Ozgur Ozkurt, Cambridge (GB); Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/923,628

(22) Filed: Mar. 16, 2018

(65) Prior Publication Data

US 2018/0276873 A1     Sep. 27, 2018

(30) Foreign Application Priority Data

Mar. 21, 2017   (GB) .................................... 1704453.8

(51) Int. Cl.
*G06T 15/20* (2011.01)
*G06T 7/174* (2017.01)
*G06T 7/11* (2017.01)
*G06F 3/14* (2006.01)
*H04N 13/106* (2018.01)
(Continued)

(52) U.S. Cl.
CPC ................ *G06T 15/20* (2013.01); *G06F 3/14* (2013.01); *G06T 7/11* (2017.01); *G06T 7/174* (2017.01); *H04N 13/106* (2018.05); *G09G 3/003* (2013.01); *G09G 5/006* (2013.01); *G09G 2340/02* (2013.01); *G09G 2350/00* (2013.01);
(Continued)

(58) Field of Classification Search
None
See application file for complete search history.

(56) References Cited

U.S. PATENT DOCUMENTS 10,332,307 B2 *  6/2019  Jin .......................... H04N 13/15
10,575,007 B2 *  2/2020  Sun ......................... G06T 15/04
(Continued)

FOREIGN PATENT DOCUMENTS

CN     105791851 A     7/2016
CN     106454012 A     2/2017
(Continued)

OTHER PUBLICATIONS

GB Combined Search and Examination report dated Sep. 14, 2017, GB Patent Application No. 1704453.8.
(Continued)

*Primary Examiner* — James A Thompson
(74) *Attorney, Agent, or Firm* — Vierra Magen Marcus LLP

(57) ABSTRACT

A method of operating a data processing system is disclosed for a data processing system that comprises a display and a display controller operable to provide to the display data in respect of output surfaces to be displayed. The method comprises, when an output surface is to be displayed, the display controller providing to the display data in respect of the output surface in the form of image data and image modification data, and the display using the image data and the image modification data when producing an output surface for display.

23 Claims, 9 Drawing Sheets

(51) Int. Cl.
    *H04N 13/00*    (2018.01)
    *G09G 3/00*     (2006.01)
    *G09G 5/00*     (2006.01)
(52) U.S. Cl.
    CPC . *G09G 2360/18* (2013.01); *H04N 2013/0081* (2013.01); *H04N 2013/0085* (2013.01)

(56) References Cited

U.S. PATENT DOCUMENTS

| | | | |
|---|---|---|---|
| 2003/0184549 A1 | 10/2003 | Kim et al. | |
| 2010/0045782 A1* | 2/2010 | Morita | H04N 13/156 348/51 |
| 2011/0102446 A1* | 5/2011 | Oterhals | G06T 11/40 345/545 |
| 2012/0257018 A1* | 10/2012 | Shigemura | G02B 27/2214 348/46 |
| 2013/0002821 A1 | 1/2013 | Okuda | |
| 2013/0034309 A1 | 2/2013 | Nystad | |
| 2013/0083161 A1 | 4/2013 | Hsu | |
| 2014/0098877 A1* | 4/2014 | Xu | H04N 19/52 375/240.16 |
| 2014/0362178 A1* | 12/2014 | Nadler | H04N 13/161 348/43 |
| 2016/0027213 A1* | 1/2016 | Burns | G06F 3/011 345/633 |
| 2016/0345022 A1* | 11/2016 | Ju | H04N 19/00 |

FOREIGN PATENT DOCUMENTS

| | | |
|---|---|---|
| GB | 2198310 A | 6/1988 |
| GB | 2516124 | 1/2015 |
| JP | H04241594 A | 8/1992 |
| WO | WO 2014/153477 | 9/2014 |
| WO | WO 2015/139626 | 9/2015 |

OTHER PUBLICATIONS

GB1704453.8—Office Action dated Oct. 31, 2019, 11 pages.
Walls et al., "Vesa Display Stream Compression," Vesa, Mar. 3, 2014, 5 pages, https://www.vesa.org/wp-content/uploads/2014/04/VESA_DSC-ETP200.pdf.

\* cited by examiner

PROVIDING OUTPUT SURFACE DATA TO A DISPLAY IN DATA PROCESSING SYSTEMS

BACKGROUND

The technology described herein relates to data processing systems, and in particular to the processing of data when generating a surface for display on a display.

In data processing systems, an image (surface) that is to be displayed will typically be processed by a number of processing stages before it is finally displayed on a display.

For example, one or more frame generators such as a graphics processing unit (GPU), video engine, etc., will generate frames (surfaces) that are to contribute to the final, displayed, surface. In addition, a composition engine may combine plural individual input surfaces into a composited output surface.

The final surface (e.g. the composited frame) to be displayed is usually stored in a frame buffer in memory, from where it is read by the display controller for the display (e.g. by internal Direct Memory Access (DMA)). The display controller then sends the frame to the display for display (e.g. via a pixel pipeline) (the display may, e.g., be a screen or printer).

The bandwidth cost of sending pixel data from the display controller to the display can be significant. Accordingly, display controllers may use compression such as Display Stream Compression (DSC) to compress pixel data sent from the display controller to the display to reduce the bandwidth and power requirements. DSC is a linear lossy compression scheme that operates to independently compress regions of the output surface.

Although such compression techniques are successful in reducing the power and bandwidth requirements of the system, the Applicants believe that there remains scope for improvements to data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
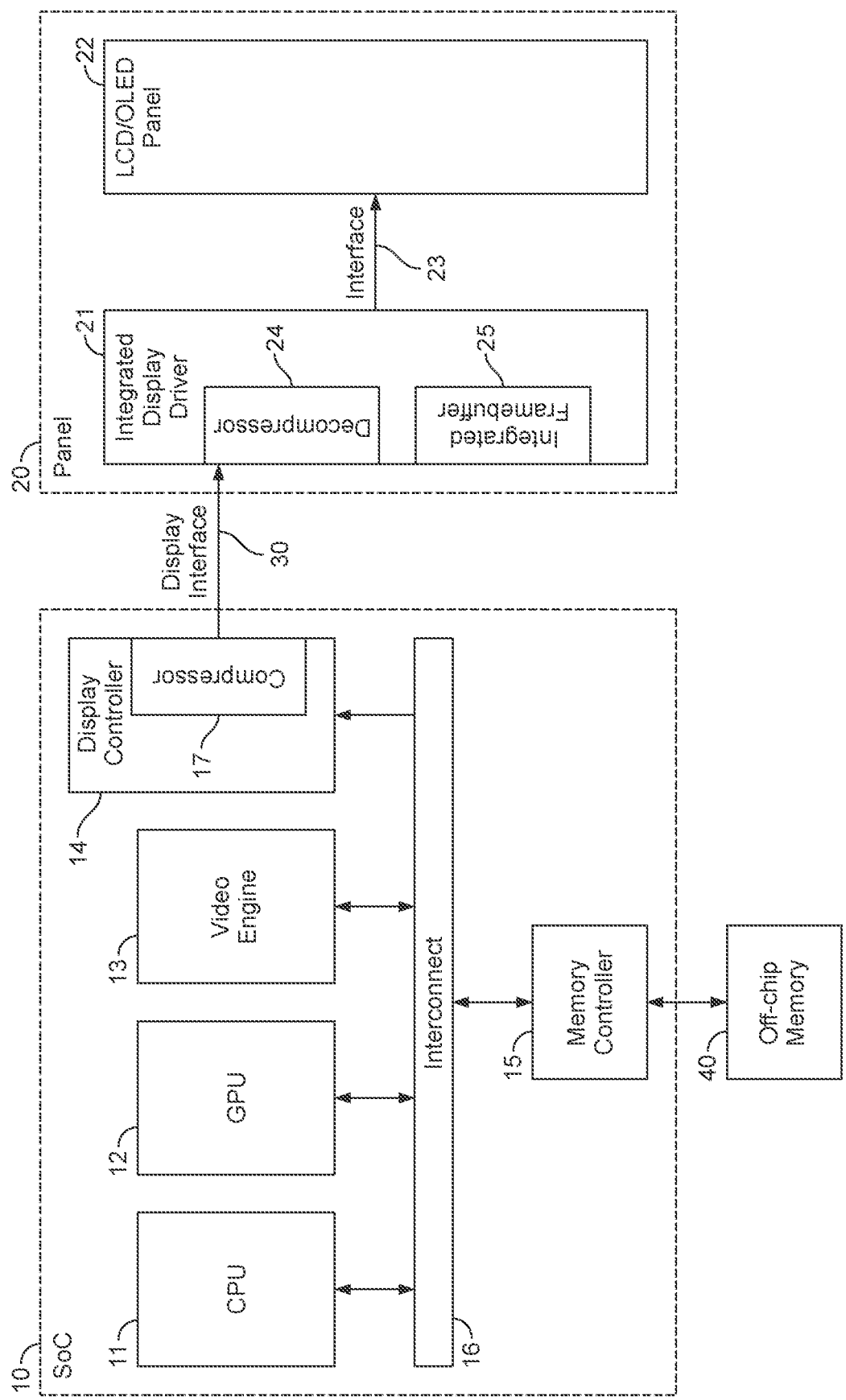
FIG. 1 shows schematically a data processing system in accordance with an embodiment of the technology described herein.

A first embodiment of the technology described herein comprises a method of operating a data processing system that comprises a display and a display controller operable to provide to the display data in respect of output surfaces to be displayed, the method comprising:

when an output surface is to be displayed:

comparing a region of the output surface to another region of an output surface;

generating information indicative of a difference and/or similarity between the region of the output surface and the other region on the basis of the comparison;

the display controller providing the difference and/or similarity indicating information to the display; and the display using the difference and/or similarity indicating information when producing an output surface for display.

A second embodiment of the technology described herein comprises a data processing system comprising:

a display;

a display controller operable to provide to the display data in respect of output surfaces to be displayed; and processing circuitry configured to: when an output surface is to be displayed, compare a region of the output surface to another region of an output surface, and to generate information indicative of a difference and/or similarity between the region of the output surface and the other region on the basis of the comparison;

wherein the display controller is configured to provide the difference and/or similarity indicating information to the display; and wherein the display is configured to use the difference and/or similarity indicating information when producing an output surface for display.

The technology described herein relates to a data processing system in which a display controller is operable to provide data in respect of output surfaces for display to a display.

In the technology described herein, when an output surface is to be displayed, a (first) region of the output surface is compared to another (second) region of an output surface, and information indicative of a difference and/or similarity between the (first) region of the output surface and the other (second) region is generated on the basis of the comparison. The display controller then provides this difference and/or similarity indicating information to the display, and the display uses the information to produce an output surface for display.

Thus, in the technology described herein, some or all of the data in respect of an output surface to be displayed can be (and is in an embodiment) sent to the display in the form of difference and/or similarity indicating information. As will be explained in more detail below, this can significantly reduce the bandwidth cost of sending output surface data to the display. This accordingly means that the display interface bandwidth and power consumption can be reduced, and that the overall memory bandwidth and power requirements of the system can be reduced.

It will be appreciated, therefore, that the technology described herein provides an improved data processing system.

The technology described herein also extends to the operation solely of a data processing system providing difference and/or similarity indicating information to a display in the manner of the technology described herein.

Thus, a third embodiment of the technology described herein comprises a method of operating a data processing system that comprises a display controller operable to provide to a display data in respect of output surfaces to be displayed, the method comprising:

when an output surface is to be displayed:

comparing a region of the output surface to another region of an output surface;

generating information indicative of a difference and/or similarity between the region of the output surface and the other region on the basis of the comparison; and the display controller providing the difference and/or similarity indicating information to a display for use by the display when producing an output surface for display.

A fourth embodiment of the technology described herein comprises a data processing system comprising:

a display controller operable to provide to a display data in respect of output surfaces to be displayed; and processing circuitry configured to: when an output surface is to be displayed, compare a region of the output surface to another region of an output surface, and to generate information indicative of a difference and/or similarity between the region of the output surface and the other region on the basis of the comparison; and wherein the display controller is configured to provide the difference and/or similarity indicating information to a display for use by the display when producing an output surface for display.

The technology described herein also extends to the operation solely of a display using difference and/or similarity indicating to produce an output surface for display in the manner of the technology described herein.

Thus, a fifth embodiment of the technology described herein comprises a method of operating a display, the method comprising:

the display receiving information indicative of a difference and/or similarity between a region of an output surface for display and another region of an output surface; and the display using the difference and/or similarity indicating information when producing an output surface for display.

A sixth embodiment of the technology described herein comprises a display comprising:

processing circuitry configured to receive information indicative of a difference and/or similarity between a region of an output surface for display and another region of an output surface and to use the difference and/or similarity indicating information when producing an output surface for display.

The display of the technology described herein may comprise any suitable display, such as for example, a screen (such as a panel) or a printer. The display may comprise a single screen (e.g. panel) or may comprise plural screens (panels). For example, in one embodiment, the display comprises a left panel configured to be viewed by the left eye and a right panel configured to be viewed by the right eye.

The display is in an embodiment configured to receive data in respect of output surfaces to be displayed from the display controller, in an embodiment via one or more appropriate display interfaces.

The or each screen (panel) may be configured to receive data in respect of output surfaces to be displayed via a single display interface.

Alternatively, e.g. where the screen in question has a particularly high resolution (or otherwise), a screen (panel) may be configured to receive data in respect of output surfaces to be displayed via plural display interfaces, e.g. via two (or more) display interfaces. This may be the case, for example, where a single screen (panel) is operable to display a pair of stereoscopic output surfaces (e.g. comprising a left image that is intended to be viewed by the left eye, and a right image that is intended to be viewed by the right eye). In this case, the display may be configured to receive data in respect the left image from the display controller via a first display interface and to receive data in respect the right image from the display controller via a second different display interface.

Other arrangements would be possible.

The display should (and in an embodiment does) comprise suitable processing circuitry configured to produce output surfaces for display from the data received from the display controller, and in an embodiment to cause the output surfaces to be displayed.

The display in an embodiment also comprises an integrated memory, e.g. frame buffer, for storing some or all of the data provided to the display by the display controller and/or output surface data produced by the display.

The display controller of the technology described herein may comprise any suitable display controller operable to provide to the display data in respect of output surfaces to be displayed, in an embodiment via the display interface(s).

The display controller is in an embodiment operable to read data in respect of one or more input surfaces to be displayed, in an embodiment from memory in which the surface data is stored, and to provide data in respect of an output surface formed from that input surface or those input surfaces to the display for display.

Accordingly the display controller in an embodiment comprises an input stage operable to read one or more regions of an input surface or surfaces. In an embodiment, the input stage comprises a read controller, such as for example a Direct Memory Access (DMA) read controller.

The display controller is operable to provide data in respect of an output surface to the display. Thus, the display controller in an embodiment comprises an output stage operable to provide output surface data to the display. This output stage may be any suitable such output stage operable to provide output surface data to the display.

The display controller may read data in respect of a single surface that it then provides all or part of to the display, or, the display controller may read in, and in an embodiment combine, data in respect of plural surfaces that it then provides all or part of to the display.

The input surfaces to the display controller may comprise, for example, one or more regions of one or more surfaces generated by a frame generator or generators, and/or one or more regions of a composited output surface composed by a composition stage or stages, etc.

Thus, the data processing system in an embodiment comprises one or more processing stages, e.g. frame generators, that is or are operable to generate the output surface for display or to generate one or more surfaces that are used to form the output surface.

The "frame generator" processing stage(s) may comprise, for example, a graphics processing unit (GPU), a video processing unit (VPU), video codec or video engine, a digital camera image signal processor (ISP), an image processor, and/or a central processing unit (CPU), etc. There may be more than one frame generator, if desired.

The or each frame generator should generate its surface in an appropriate manner, e.g. by rendering the surface in the case of a graphics processor, by appropriately decoding input encoded video data in the case of a VPU, video codec or video engine, from a captured image in the case of a digital camera image signal processor (ISP), etc.

The data processing system may also include a processing stage or stages that is or are operable to process a previously generated surface or surfaces, e.g. in order to produce an, e.g., modified version of that surface or surfaces.

For example, the data processing system may comprise a composition stage or engine operable to compose (two or more) surfaces to generate a composited output surface. In this case, the surfaces that are composed by the composition stage in an embodiment comprise (two or more of) the surfaces generated by the one or more frame generators. Accordingly, the composition stage is in an embodiment operable to read (two or more) surfaces from memory, to compose the surfaces to generate a composited surface (e.g. by blending or otherwise combining the surfaces). The composition stage may store the composited output surface in memory or alternatively, e.g. where the composition stage is part of the display controller, the composition stage may pass the composited output surface (directly) to the display, e.g. via the display interface(s). In an embodiment, the composited surface is to be used as the output surface for display.

The data processing system may also or instead (and in an embodiment also) comprise one or more processing stages that are operable to perform other types of processing and/or modifications, such as image enhancement, rotation, scaling, etc., to generate the output surface.

One or more or each of the surface generating processing stages may be operable to store their respective output surfaces in memory (and correspondingly to read surfaces that they are to process from memory (where appropriate)). This memory may comprise any suitable memory and may be configured in any suitable and desired manner. For example, it may be a memory that is on chip with and/or local to the processing stage in question or it may be an external memory. In an embodiment it is an external memory, such as a main memory of the data processing system. It may be dedicated memory for this purpose or it may be part of a memory that is used for other data as well. In an embodiment the one or more surfaces are stored in (and read from) one or more frame buffers. For example, respective processing stage frame buffers may be provided in the main memory of the data processing system.

The data processing system of the technology described herein is operable, when an output surface is to be displayed, to compare a (first) region of the output surface to another (second) region of an output surface.

The output surface for display may comprise any suitable such surface (e.g. frame) for display.

The output surface is in an embodiment one such output surface (frame) in a sequence of output surfaces (frames) for display. The or each output surface is in an embodiment an image, e.g. frame, for display. The or each output surface (frame) in an embodiment comprises an array of plural data positions, with each data position taking a particular data (e.g. colour) value.

The (first) region of the output surface that is compared to another (second) surface region may comprise any suitable region of the output surface. It may, for example, comprise the whole of the output surface (frame).

Alternatively, the region of the output surface that is compared to another surface region may comprise less than the whole of the output surface (frame), i.e. one or more sub-region of the output surface (frame).

In this case, the sub-region or sub-regions may comprise any suitable sub-region or sub-regions of the output surface. For example, the sub-region may comprise some fraction of the output surface (frame), such as half, a third, a quarter, etc. of the output surface.

In an embodiment, the output surface is divided or partitioned into a plurality of identifiable smaller sub-regions each representing a part of the overall surface, and the region of the output surface that is compared to another surface region comprises one or more or each of these sub-regions. The sub-division of the output surface can be done as desired, and each sub-region can represent any suitable and desired region (area) of the overall output surface.

Each sub-region in an embodiment represents a different part of the overall output surface (although the sub-regions could overlap if desired). Each sub-region should represent an appropriate portion (area) of the output surface (plurality of data positions within the array).

In an embodiment, the output surface is divided into an array of regularly sized and shaped sub-regions, in an embodiment in the form of squares or rectangles, and the region of the output surface that is compared to another surface region comprises one or more or each of these regularly sized and shaped sub-regions. Suitable sub-region sizes would be, e.g., 8×8, 16×8, 16×16, 32×4, 32×8, or 32×32 data positions in the data array. Other arrangements would, of course, be possible.

In an embodiment, each such regularly sized and shaped sub-region corresponds to a "tile", e.g. that a processing stage, e.g. frame generator, of the data processing system produces as its output. Thus, in an embodiment, one or more sub-regions, e.g. tiles, of the output surface is compared with another region of an output surface.

The (second) surface region to which the (first) region of the output surface is compared may comprise any suitable region of any suitable surface.

The other (second) region to which the (first) output surface region is compared may be part of the same output surface as the first output surface region, or it may be a region of a different output surface (frame) for display, such as a previous output surface in the sequence of output surfaces (frames) for display, or otherwise.

The (second) surface region to which the (first) region of the output surface is compared may comprise the whole of the surface (frame) or less than the whole of the surface (frame), i.e. one or more sub-regions of the surface (frame).

Again, in this latter case the sub-region or sub-regions may comprise any suitable sub-region or sub-regions of the surface, such as a fraction of the output surface (frame), or one or more regularly sized and shaped sub-regions (e.g. tiles) of plural such sub-regions (e.g. tiles) into which the surface is divided, e.g. (and in an embodiment as described above.

The (second) surface region to which the (first) region of the output surface is compared should (and in an embodiment does) have the same configuration, e.g. size and/or shape, as the (first) output surface region to which it is compared. Accordingly, the (second) surface region to which the (first) region of the output surface is compared in an embodiment has the same number (and arrangement) of data positions as the (first) output surface region to which it is compared.

Thus, in an embodiment, the comparison is between the whole of the output surface (frame) and the whole of another surface (frame). In another embodiment, the comparison is between one or more sub-regions of the output surface (frame) and one or more, in an embodiment corresponding, sub-regions of another surface (frame).

In these embodiments, where the second region is part of another output surface, the other surface (frame) may comprise any suitable other surface.

In one embodiment, the comparison is between a region of an output surface (e.g. the current output surface that is being processed for display) and a region of a previous output surface, e.g. in the sequence of output surfaces (frames). The previous output surface may be the output surface that immediately precedes the output surface in the sequence of output surfaces, or an earlier output surface in the sequence of output surfaces.

In this regard, the Applicants have recognised that it will often be the case that sequential output surfaces (frames) are similar, and therefore that providing at least some of the data in respect of an output surface (frame) to be displayed to the display in the form of difference and/or similarity indicating information can significantly reduce the bandwidth cost of sending the data to the display.

Thus, in an embodiment, the method comprises, when a new output surface is to be displayed, comparing (and the system is configured to compare) (a region of) the new output surface to a previous version of (the region of) the output surface.

In another embodiment, the comparison is between each image (surface) of a pair of (left and right) stereoscopic output surfaces.

As will be appreciated by those having skill in the art, a pair of stereoscopic output surfaces comprises a left image, e.g. that is intended to be viewed by the left eye, and a right image, e.g. that is intended to be viewed by the right eye, configured to produce the impression of a three dimensional image when respective images are viewed by respective eyes. The Applicants have recognised that it will often be the case that the left and right images of a pair of stereoscopic output surfaces are similar, and therefore that providing at least some of the data in respect of a pair of stereoscopic output surfaces to be displayed to the display in the form of difference and/or similarity indicating information, can significantly reduce the bandwidth cost of sending the stereoscopic image output data to the display.

Thus, in an embodiment, the method comprises, when a pair of stereoscopic output surfaces are to be displayed, comparing (and the system is configured to compare) a region of the left image of the pair to a (corresponding) region of the right image of the pair.

In another embodiment, the comparison is between one or more sub-regions of the output surface (frame) and one or more other sub-regions of the (same) output surface (frame).

In this regard, the Applicants have recognised that it can often be the case that sub-regions, e.g. tiles, of an output surface (frame) may be similar, and therefore that providing at least some of the data in respect of an output surface (frame) to be displayed to the display in the form of difference and/or similarity indicating information can significantly reduce the bandwidth cost of sending the data to the display.

Thus, in an embodiment, the method comprises, when a new output surface is to be displayed, comparing (and the system is configured to compare) one or more sub-regions of the output surface to one or more other sub-regions of the output surface.

In these embodiments, each sub-region (e.g. tile) of the output surface is in an embodiment compared to another sub-region (e.g. tile) of the output surface. Each sub-region (e.g. tile) is in an embodiment compared to at least one or more adjacent sub-regions (e.g. tiles) in the output surface. In an embodiment the output surface is (generated and) processed sub-region by sub-region (e.g. tile by tile) in raster order, and each sub-region (e.g. tile) is compared to at least its two (previously processed) adjacent sub-regions (e.g. tiles) (e.g. the sub-regions immediately above and immediately to the left of the sub-region in question) in the output surface.

These embodiments may be combined as appropriate. Thus, for example, in one embodiment, a comparison is made between (a region of) the left image of a pair of stereoscopic output surfaces and a previous version of (the region of) the left image of the pair of stereoscopic output surfaces, and a comparison is made between (a region of) the right image of the pair of stereoscopic output surfaces and a previous version of (the region of) the right image of the pair of stereoscopic output surfaces.

Other arrangements would be possible.

The difference and/or similarity indicative information generated by the comparison may comprise any suitable such information. The difference and/or similarity indicating information may comprise difference indicating information (i.e. that indicates one or more differences between the regions), similarity indicating information (i.e. that indicates one or more similarities between the regions), or information that indicates both a difference or differences and a similarity or similarities between the regions.

Equally, the difference and/or similarity indicative information may be generated at any suitable granularity (resolution). For example, the difference and/or similarity indicative information may be indicative of the difference and/or similarity between (the data values of) individual data positions of the regions, between (the data values of) sets of plural data positions of the regions, or between the (first and second) regions themselves (as a whole).

In one embodiment, the comparison of the regions is so as to determine differences between corresponding data values of the regions. In this case, the data value of one or more, in an embodiment each, data position of the first region may be compared with the data value of the corresponding data position of the second region, i.e. so as to determine the difference. As such, the difference and/or similarity information may comprise one or more difference values (i.e. one or more so-called "delta" values), e.g. and in an embodiment an array of such difference values.

In another embodiment, the comparison of the regions is so as to determine whether the first region is the same as (or at least sufficiently similar to) the second region (or not).

This comparison can be done in any suitable and desired manner. Thus, for example, some or all of the content of the first region may be compared with some or all of the content of the second region (and in one embodiment this is done).

This comparison process may, e.g., require an exact match for the regions to be considered to be the same, or only a sufficiently similar (but not exact) match, e.g., that exceeds a given threshold, could be required for the regions to be considered to be the same.

In one embodiment, the comparison is performed by comparing lower resolution versions and/or lower precision versions of the respective (first and second) regions, e.g., and in an embodiment, to assess the similarity or otherwise of the regions.

In another embodiment, the comparison is performed by comparing information representative of and/or derived from the content of the first region with information representative of and/or derived from the content of the second region, e.g., and in an embodiment, to assess the similarity or otherwise of the regions. Thus, in an embodiment, information representative of and/or derived from the content of each region is generated for each region that is to be compared.

The information representative of the content of the regions is in an embodiment in the form of information representative of the content of each region (e.g. tile). This information for each region (e.g. tile) may take any suitable form, but is in an embodiment based on or derived from the content of the respective region. In an embodiment it is in the form of a "signature" for the surface region which is generated from or based on the content of the surface region. Such a surface region content "signature" may comprise, e.g., and in an embodiment, any suitable set of derived information that can be considered to be representative of the content of the surface region, such as a checksum, a CRC, or a hash value, etc., derived from (generated for) the data for the surface region. Suitable signatures would include standard CRCs, such as CRC32, or other forms of signature such as MD5, SHA 1, etc.

Thus, in an embodiment, a signature indicative or representative of, and/or that is derived from, the content of each surface region is generated for each surface region that is to be compared, and the comparison process comprises comparing the signatures of the respective surface regions.

It would be possible to generate a single signature for a surface region (e.g. tile). Alternatively, plural signatures could be generated for each surface region.

In one such embodiment, a signature representative of the most significant bits (MSBs) of the content of each surface region and a signature representative of the least significant bits (LSBs) of the content of each surface region is generated for each surface region that is to be compared, and the comparison process comprises comparing one or both of these signatures for the respective surface regions.

It would also or instead be possible, for example, for separate signatures (e.g. CRCs) to be generated for each (e.g. colour (e.g. RGB) or luma and chroma (YUV)) plane.

As will be appreciated by those skilled in the art, the longer the signature that is generated for a surface region is (the more accurately the signature represents the surface region), the less likely there will be a false "match" between signatures. Thus, in general, a longer or shorter signature (e.g. CRC) could be used, depending on the accuracy desired (and as a trade-off relative to the resources required for the signature generation and processing, for example).

In an embodiment, the signature is weighted towards a particular aspect of the output surface's content as compared to other aspects of the output surface's content (e.g., and in an embodiment, to a particular aspect or part of the data for the surface region (the data representing the surface region's content)). This may allow, e.g., a given overall length of signature to provide better overall results by weighting the signature to those parts of the content (data) that will have more effect on the overall output (e.g. as perceived by a viewer of the output surface).

In an embodiment, a longer (more accurate) signature is generated for the MSB bits of a colour as compared to the LSB bits of the colour. (In general, the LSB bits of a colour are less important than the MSB bits, and so the Applicants have recognised that it may be acceptable to use a relatively inaccurate signature for the LSB bits, as errors in comparing the LSB bits for different surface regions (e.g. tiles) will, the Applicants believe, have a less detrimental effect on the overall output.)

It would also be possible to use different length signatures for different applications, etc., depending upon the, e.g., application's, e.g., display, requirements. This may further help to reduce power consumption.

Thus, in an embodiment, the technology described herein comprises comparing a signature representative of the content of a region (e.g. a tile) of the output surface with a signature representative of the content of another region (e.g. tile) of an output surface, and generating information indicating whether the regions are the same (or at least sufficiently similar) (or not), i.e. similarity indicating information, based on the comparison.

Other arrangements would be possible.

The comparison operation and the generation of the difference and/or similarity indicating information may be performed by any suitable part of the data processing system.

It would be possible, for example, for one of the frame generators or other processing stages, e.g. the GPU, CPU, video engine, ISP, etc. of the data processing system to perform the comparison, and to generate the difference and/or similarity indicating information.

In these embodiments, the processing stage in question may be configured to read in (at least) the (first and second) surface regions in question (if necessary), e.g. from memory, to compare the surface regions (e.g. as described above), i.e. to generate the difference and/or similarity indicating information, and to then provide the difference and/or similarity indicating information to the display controller, e.g. by writing it to (the) memory. Correspondingly, the display controller may be configured to read the difference and/or similarity indicating information, e.g. from memory, and to provide that information to the display, e.g. in the manner of the technology described herein.

In another embodiment, the display controller itself is configured to perform the comparison and to generate the difference and/or similarity indicating information. Thus, in an embodiment, the display controller may read (at least) the (first and second) surface regions to be compared, e.g. from memory, and in an embodiment compare them (e.g. as described above), i.e. in order to generate the difference and/or similarity indicating information, and to then provide the difference and/or similarity indicating information (directly) to the display, e.g. via the display interface(s).

This represents a particularly convenient arrangement, since for example, in this case there is no need for the difference and/or similarity indicating information to be written to (and then read from) memory, thereby reducing memory bandwidth and power. In addition, the "standard" operation of the frame generator(s) or other processing state(s) (i.e. generating surfaces and storing them in memory) need not be modified (and e.g. only the operation of the display controller and the display may be modified).

This arrangement may be particularly useful, for example, where (as described above) the regions that are compared are regions of the same surface, since the display controller will normally be configured to read in the (whole of the) surface in any event, i.e. in order to be able to provide it to the display, and so will have access to all of the appropriate data for comparison without having to read any additional data.

This may also be particularly useful, for example, where (as described above) the left and right images of a pair of stereoscopic output surfaces are compared, since the display controller will normally be configured to read in (the whole of) both images in any event, e.g. simultaneously, and will therefore have access to all of the appropriate data for comparison without having to read any additional data.

Thus, in an embodiment, the method of the technology described herein comprises the display controller reading a region of the output surface and another region of an output surface, comparing the region of the output surface and the other region, generating information indicative of a difference and/or similarity between the regions on the basis of the comparison, and providing the difference and/or similarity indicating information (directly) to the display.

On the other hand, where as described above the comparison is made between regions of different (e.g. sequential) output surfaces, then in an embodiment, the video engine (VPU) is configured to perform the comparison and to generate the difference and/or similarity information.

This represents a particularly convenient and efficient arrangement since, for example, the video engine will typically read in two or more sequential output surfaces, e.g. as part of its decoding operation, and will therefore have access to all of the appropriate data for comparison without having to read any additional data.

Thus, in an embodiment, the method of the technology described herein comprises the video engine (VPU) reading a region of the output surface and another region of an output surface, comparing the region of the output surface and the other region, generating information indicative of a difference and/or similarity between the regions on the basis of the comparison, and providing the difference and/or similarity indicating information to the display controller, e.g. by writing the information to memory. (The display controller may then be configured to read the difference and/or similarity indicating information, e.g. from memory, and to provide that information to the display, e.g. in the manner of the technology described herein.)

The data processing system may be operable to compare surface regions and generate difference and/or similarity indicating information in the manner of the technology described herein in respect of each and every output surface region to be displayed. Alternatively, the data processing system may be operable to compare surface regions and generate difference and/or similarity indicating information in respect of only some (less than all) output surface regions to be displayed.

In an embodiment, the data processing system is operable to selectively compare surface regions and generate difference and/or similarity indicating information. In other words, the comparison and difference and/or similarity indicating information generating operations may be selectively enabled and disabled. In these embodiments, the selection of which surface regions should be compared to generate difference and/or similarity indicating information may be made in any suitable manner.

For example, in one embodiment, only surface regions which have a particular property are compared to generate difference and/or similarity indicating information in the manner of the technology described herein. In this case, the particular property may be selected as desired. For example, in one embodiment, (only) inter frames, e.g. generated by the video engine, are compared to generate difference and/or similarity indicating information in the manner of the technology described herein.

In another embodiment, the data processing system may be operable to selectively compare surface regions and generate difference and/or similarity indicating information based on knowledge of or a prediction of the likelihood that the regions will be similar, e.g. such that the additional bandwidth and/or power used for the comparison and generation operations is outweighed by the bandwidth and/or power savings made by sending data to the display in the form of difference and/or similarity indicating information.

For example (and in an embodiment), surface region data (i.e. image data and/or difference and/or similarity information) that is written to memory may be compressed (to thereby save memory bandwidth and power).

The Applicants have recognised that in this case, it is possible to use the degree to which the difference and/or similarity information is compressed, i.e. the compression rate, to determine whether it would be worthwhile to perform the comparison operation to generate difference and/or similarity information, e.g. for the next surface region or surface (and in an embodiment this is done). This is because where the (first and second) regions that are compared are relatively similar, the difference and/or similarity indicating information will comprise a relatively small spread of (difference) values (e.g. a large number of zeros), and will therefore be relatively highly compressible. On the other hand, where the (first and second) regions that are compared are dissimilar, the difference and/or similarity indicating information will comprise a relatively large spread of (difference) values, and will therefore be compressible to a lesser degree. Since, as described above, sequential regions and/or surfaces are likely to be similar, the degree to which the difference and/or similarity indicating information is compressed can be used to predict the likelihood that subsequent regions to be compared will be similar.

Thus, in an embodiment, the data processing system is operable to selectively compare surface regions and generate difference and/or similarity indicating information (i.e. to selectively enable and disable the comparison and difference and/or similarity indicating information generating operations) depending on the compression rate of the difference and/or similarity indicating information.

In embodiments where the surface region data is compressed, the data may be compressed using any suitable compression scheme, such as ARM Frame Buffer Comparison (AFBC) (AFBC is described in US 2013/0034309).

In another embodiment, one or more processing stages of the data processing system, e.g. the GPU, CPU, video engine, ISP, etc. (in an embodiment the processing stage that generates the output surface), may be configured to generate information that is indicative of the likelihood that one or more or each output surface region will be similar to a region to which it will be compared (e.g. such that the additional bandwidth and/or power used for the comparison and generation operations is outweighed by the bandwidth and/or power savings made by sending data to the display in the form of difference and/or similarity indicating information).

In this regard, the Applicants have recognised in particular that, in the case of video data, it is relatively straightforward for the video engine to determine the likelihood that a region will be similar or sufficiently similar to a previous version of that region, e.g. so as to justify the extra cost of performing comparison.

Generally, in encoded video data, such as differential encoded video data, each video frame is divided into a plurality of blocks (e.g. 16×16 pixel blocks for H.264 up to 64×64 pixel blocks for HEVC) and each block of the frame is encoded individually. Typically, each block can be divided into a number of motion predicted or non-motion predicted regions of various sizes (e.g. regions of 8×8, 16×8, 8×16, 16×16, 32×32, or 64×64 pixels). Each motion predicted region usually comprises at least one vector value (the so-called "motion vector") pointing to an area of a reference frame to be used to construct the appropriate area (region) of the (current) frame, and data describing the differences between the two areas (the "residual"). (This thereby allows the video data for the area of the (current) frame to be constructed from video data describing the area in the reference frame pointed to by the motion vector and the difference data describing the differences between that area and the area of the current video frame.)

The Applicants have recognised that such information can be used to assess the likelihood that a region will be similar, or will be sufficiently similar, to a previous version of the region, e.g. such that the extra cost of performing comparison and generation operations for the surface region may be justified. In particular, the Applicants have recognised that such information can indicate whether or not a given region has changed from one surface (frame) to the next, and that this information can be (and is in an embodiment) used in the context of comparison and generation operations, to selectively enable and disable the comparison and difference and/or similarity indicating information generating operations.

For example, in cases where the reference frame for a given frame is the previous frame, if a given region (data block) is encoded with a motion vector of zero (i.e. (0, 0)), and a residual of zero, then that region (block of data) will not have changed relative to the equivalent region (block of data) in the previous frame.

Equally, if a given region (data block) is encoded with a motion vector of zero (i.e. (0, 0)), and a non-zero but relatively small residual, or if a given region (data block) is encoded with a non-zero but relatively small motion vector, then that region is likely to have changed by a small amount relative to the equivalent region in the previous frame. As such, this may be used to indicate that the region is sufficiently similar to the previous version of the region such that the extra cost of performing comparison and generation operations for the surface region will be justified.

Where the reference frame for a given frame is not the previous frame, e.g. where the reference frame is an earlier frame than the previous frame, the information encoding a particular region may indicate that the region is identical to (or sufficiently similar to) a region in the reference frame. In this case, if it can be determined that the intermediate region(s) (block or blocks) are also identical to (or sufficiently similar to) the reference frame region, then again, it can be determined that the region will not have changed relative to the corresponding region (block of data) in the previous frame.

Thus, in an embodiment, the video engine (VPU) is configured to generate information indicative of the likelihood that a region will be similar to a previous version of the region, and to provide that information to the processing stage of the data processing system (e.g. the display controller) that is configured to perform the comparison and generate the similarity and/or difference indicating information, e.g. by the video engine writing that information to memory. The processing stage (e.g. display controller) of the data processing system that is configured to perform the comparison and generate the similarity and/or difference indicating information may then read the information, and use it to determine when to perform the comparison operation and generate similarity and/or difference indicating information in accordance with the technology described herein.

Thus, in an embodiment, the (display controller of the) data processing system is operable to selectively compare surface regions and generate difference and/or similarity indicating information (i.e. to selectively enable and disable the comparison and difference and/or similarity indicating information generating operations) based on information generated by the video engine.

It would also or instead be possible, where signatures are generated for surface regions (e.g. as described above), to use signature comparisons to determine when to perform the comparison to generate difference and/or similarity indicating information (and in one embodiment this is done). In other words, a signature comparison process may be used, not for the generation of the difference and/or similarity information itself as described above, but instead to determine whether or not the comparison operation to generate difference and/or similarity information of the technology described herein should be performed for a particular region.

For example, a signature comparison may be used as an initial, e.g. relatively low-accuracy, test to determine whether the (first and second) regions are sufficiently similar such that it would be worthwhile for the data processing system to perform a "full" comparison operation to generate difference and/or similarity information, e.g. to produce an array of difference ("delta") values as described above.

Thus, in an embodiment, the method of the technology described herein comprises when an output surface is to be displayed, comparing a signature representative of the content of a region (e.g. tile) of the output surface with a signature representative of the content of another region (e.g. tile) of an output surface, and determining whether (or not) to compare the surface regions and generate information indicating a difference and/or similarity between the regions (i.e. in the manner of the technology described herein) based on the signature comparison. That is, the data processing system is operable to selectively compare surface regions and generate difference and/or similarity indicating information (i.e. to selectively enable and disable the comparison and difference and/or similarity indicating information generating operations) based on a signature comparison.

In these embodiments, the signature comparison could be made between the "full" signatures, e.g. CRC signatures, of the respective (first and second) regions. Alternatively, since in these embodiments the signature comparison is in an embodiment used only as a relatively low-accuracy test, it would be possible to compare signatures representative of lower resolution versions or lower precision versions of the respective (first and second) regions. Equally, where, as described above, separate signatures are generated for the MSB bits and the LSB bits of the regions' data, only one of these signatures (e.g. the MSB signatures) may be compared (and in an embodiment this is done).

It would also or instead be possible to use comparisons between lower resolution versions and/or lower precision versions of the respective (first and second) regions to determine when to perform the comparison to generate difference and/or similarity indicating information (and in one embodiment this is done). In other words, a lower resolution region or lower precision (or both a lower resolution region and lower precision) region comparison process may be used, not for the generation of the difference and/or similarity information itself as described above, but instead as an initial low accuracy comparison to determine whether or not the comparison operation to generate difference and/or similarity information of the technology described herein should be performed for a particular region.

It would also be possible to use an initial lower accuracy comparison, e.g. between the MSB signatures, to determine whether or not to perform another, in an embodiment more accurate comparison, e.g. between the LSB signatures.

Thus for example, in one embodiment, the method of the technology described herein comprises when an output surface is to be displayed, comparing a signature representative of the most significant bits (MSBs) of the content of a (first) region (e.g. tile) of the output surface with a signature representative of the most significant bits (MSBs) of the content of another (second) region (e.g. tile) of an output surface to determine whether (or not) the signatures are the same (or sufficiently similar).

Where these signatures are determined to be dissimilar (or insufficiently similar), then the (first) region of the output surface is in an embodiment provided to the display, i.e. in the form of image data (and the (first) region is in an embodiment not (is other than) compared to the other (second) region to generate similarity and/or difference indicating information).

Where these signatures are determined to be the same (or sufficiently similar), then a signature representative of the least significant bits (LSBs) of the content of the first region (e.g. tile) is in an embodiment compared with a signature representative of the least significant bits (LSBs) of the content of the second region (e.g. tile) to determine whether (or not) these signatures are the same (or sufficiently similar).

Where these signatures are determined to be dissimilar (or insufficiently similar), then the (first) region of the output surface is in an embodiment compared to the other (second) region to generate similarity and/or difference indicating information, e.g. so as to determine an array of difference ("delta") values as described above, and the (first) region is in an embodiment provided to the display at least partially in the form of this difference and/or similarity indicating information.

Where, on the other hand, these signatures are determined to be the same (or sufficiently similar), then the (first) region of the output surface may be provided to the display at least partially using similarity indicating ("copy") information (and the (first) region may not be (may be other than) compared to the other (second) region to generate similarity and/or difference indicating information).

In the technology described herein, the display controller provides the difference and/or similarity indicating information to the display and the display uses the difference and/or similarity indicating information to produce an output surface for display.

The output surface for display is in an embodiment produced by the display using output surface image data together with the difference and/or similarity indicating information.

Thus for example, where the difference and/or similarity indicating information indicates the difference and/or similarity between a (current) output surface region and previous version of the output surface region, the new output surface region may be produced by the display using the difference and/or similarity indicating information together with the previous output surface region image data, e.g. by applying the difference and/or similarity indicating information to the previous output surface region image data in order to reconstruct the new output surface region image data.

Equally, where the difference and/or similarity indicating information indicates the difference and/or similarity between regions of the left and right images of a pair of stereoscopic output surfaces, a region or regions of one of the images, e.g. the left or right image, may be provided to the display as normal, i.e. in the form of image data, and a region or regions of the other image may be provided to the display in the form of difference and/or similarity indicating information. In this case, a region or regions of one of the images, e.g. the left or right image, may be produced by the display using only the image data, and a region or regions of the other image may be produced by the display using the difference and/or similarity indicating information together with the image data, e.g. by applying the difference and/or similarity indicating information to the image data in order to reconstruct the other image region or regions.

Equally, where the difference and/or similarity information indicates the similarity between sub-regions (e.g. tiles) of an output surface, then one or more sub-regions of the output surface may be provided to the display in the form of image data, and one or more other sub-regions of the output surface may be provided to the display in the form of similarity indicating information. The display in an embodiment then produces, e.g. reconstructs, the output surface using the image data together with the similarity indicating information, e.g. by appropriately copying the image data in respect of sub-regions that are provided to the display in the form of similarity indicating information.

It would also be possible for the display controller to provide other information to the display and for the display to use the other information to produce the output surface for display.

For example, in the case of a pair of stereoscopic output surfaces, the display controller could (and in one embodiment does) additionally provide an offset value to the display.

Since the left and right images of a pair of stereoscopic output surfaces are typically very similar except that they are shifted by a relatively small distance relative to one another, e.g. that depends on the interocular distance, the difference and/or similarity indicating information could be (and in an embodiment is) determined by comparing a region of the left image to a version of a (corresponding) region of the right image that has been shifted by an offset distance, e.g. where the offset is configured to take into account the interocular distance (or by comparing a region of the right image to a version of a (corresponding) region of the left image that has been shifted by an offset distance that is configured to take into account the interocular distance).

Since in these embodiments, the regions that are compared will often be more similar than would otherwise be the case, this arrangement can have the effect of further reducing the amount of similarity and/or difference indicating information and therefore the bandwidth and power requirements of the system. In these embodiments, the offset value is in an embodiment provided to the display, and the display in an embodiment uses the offset value to reconstruct the pair of stereoscopic output surfaces.

In an embodiment, the image data provided to the display by the display controller is compressed. Similarly, the difference and/or similarity information may be compressed, e.g. using the same compression scheme as is used for the image data or otherwise. The image data and/or the difference and/or similarity information may be compressed using any suitable compression scheme, such as for example Display Stream Compression (DSC). Alternatively, the difference and/or similarity information could be compressed using Golomb coding, or another appropriate coding scheme.

The (display controller of the) data processing system may be operable to always provide output surfaces to the display at least partially in the form of difference and/or similarity indicating information whenever difference and/or similarity indicating information is generated.

Alternatively, the data processing system may be operable to provide output surfaces to the display at least partially in the form of difference and/or similarity indicating information in respect of only some (less than all) surface for which difference and/or similarity indicating information is generated.

For example, where the amount of difference and/or similarity indicating information produced for a particular output surface region is relatively large (e.g. since the (first and second) regions are in fact relatively dissimilar), e.g. greater than a threshold, then the output surface region may be provided to the display in the form of image data (and not difference and/or similarity indicating information) (and in one embodiment this is done).

In another embodiment, the data processing system may be configured to always provide some output surfaces in the sequence of output surfaces to the display (entirely) in the form of image data, e.g. periodically, in order to reduce or avoid errors in the displayed output surfaces building up over time Although the above embodiments have been described in terms of providing difference and/or similarity indicating information to a display for use in displaying an output surface, the Applicants have additionally recognised that it would be possible to provide output surface data to the display in other forms.

In particular, where a pair of stereoscopic surfaces is to be displayed by the display, rather than the display controller providing to the display a pair of output surfaces, it would instead be possible to provide to the display data in respect of a single output surface (image), together with depth data. In this case, the display may be configured to use the data in respect of the single output surface (image) and the depth data to produce (reconstruct) the pair of stereoscopic output surfaces for display. This can again reduce the bandwidth cost of sending output surface data to the display, and accordingly means that the overall memory bandwidth and power requirements of the system can be reduced.

Thus, another embodiment of the technology described herein comprises a method of operating a data processing system that comprises a display and a display controller operable to provide to the display data in respect of output surfaces to be displayed, the method comprising:

when a pair of stereoscopic output surfaces is to be displayed:

the display controller providing to the display data in respect of the pair of stereoscopic output surfaces in the form of image data and depth data; and the display using the image data and the depth data when producing a pair of stereoscopic output surfaces for display.

Another embodiment of the technology described herein comprises a data processing system comprising:

a display; and a display controller operable to provide to the display data in respect of output surfaces to be displayed;

wherein the display controller is configured to: when a pair of stereoscopic output surfaces is to be displayed, provide to a display data in respect of the pair of stereoscopic output surfaces in the form of image data and depth data; and wherein the display is configured to use the image data and the depth data when producing a pair of stereoscopic output surfaces for display.

Another embodiment of the technology described herein comprises a method of operating a data processing system that comprises a display controller operable to provide to a display data in respect of output surfaces to be displayed, the method comprising:

when a pair of stereoscopic output surfaces is to be displayed:

the display controller providing to a display data in respect of the pair of stereoscopic output surfaces in the form of image data and depth data for use by the display when producing a pair of stereoscopic output surfaces for display.

Another embodiment of the technology described herein comprises a data processing system comprising:

a display controller operable to provide to a display data in respect of output surfaces to be displayed;

wherein the display controller is configured to: when a pair of stereoscopic output surfaces is to be displayed, provide to a display data in respect of the pair of stereoscopic output surfaces in the form of image data and depth data for use by the display when producing a pair of stereoscopic output surfaces for display.

Another embodiment of the technology described herein comprises a method of operating a display comprising:

the display receiving data in respect of a pair of stereoscopic output surfaces in the form of image data and depth data; and the display using the image data and the depth data when producing a pair of stereoscopic output surfaces for display.

Another embodiment of the technology described herein comprises a display comprising:

processing circuitry configured to receive data in respect of a pair of stereoscopic output surfaces in the form of image data and depth data, and to use the image data and the depth data when producing a pair of stereoscopic output surfaces for display.

As will be appreciated by those skilled in the art, these embodiments of the technology described herein can, and in an embodiment do, include one or more or all of the optional features of the technology described herein described herein, as appropriate.

In these embodiments, the image data is in an embodiment for a single surface (image). The display in an embodiment generates (reconstructs) the pair of stereoscopic output surfaces (i.e. the left and right images) by appropriately combining the image data and the depth data.

It is believed, more generally, that the idea of a display controller providing to a display image data together with image modification data (which could be difference and/or similarity indicating information, depth information, or otherwise), and the display using the image data and the image modification data to produce an output surface for display is new and advantageous in its own right.

Thus, another embodiment of the technology described herein comprises a method of operating a data processing system that comprises a display and a display controller operable to provide to the display data in respect of output surfaces to be displayed, the method comprising:

when an output surface is to be displayed:

the display controller providing to the display data in respect of the output surface in the form of image data and image modification data; and the display using the image data and the image modification data when producing an output surface for display.

Another embodiment of the technology described herein comprises a data processing system comprising:
a display; and
a display controller operable to provide to the display data in respect of output surfaces to be displayed;
wherein the display controller is configured to: when an output surface is to be displayed, provide to the display data in respect of the output surface in the form of image data and image modification data; and
wherein the display is configured to use the image data and the image modification data when producing an output surface for display.

Another embodiment of the technology described herein comprises a method of operating a data processing system that comprises a display controller operable to provide to a display data in respect of output surfaces to be displayed, the method comprising:
when an output surface is to be displayed:
the display controller providing to the display data in respect of the output surface in the form of image data and image modification data for use by the display when producing an output surface for display.

Another embodiment of the technology described herein comprises a data processing system comprising:
a display controller operable to provide to a display data in respect of output surfaces to be displayed;
wherein the display controller is configured to: when an output surface is to be displayed, provide to the display data in respect of the output surface in the form of image data and image modification data for use by the display when producing an output surface for display.

Another embodiment of the technology described herein comprises a method of operating a display comprising:
the display receiving data in respect of an output surface in the form of image data and image modification data; and
the display using the image data and the image modification data when producing an output surface for display.

Another embodiment of the technology described herein comprises a display comprising:
processing circuitry configured to receive data in respect of an output surface in the form of image data and image modification data, and to use the image data and the image modification data when producing an output surface for display.

As will be appreciated by those skilled in the art, these embodiments of the technology described herein can, and in an embodiment do, include one or more or all of the optional features of the technology described herein, as appropriate.

Thus, for example, the image modification data may comprise difference and/or similarity indicating information, e.g. and in an embodiment as described above.

Alternatively, the image modification data may comprise depth data, e.g. and in an embodiment as described above.

Although the technology described herein is described above with particular reference to the processing of a given output surface region, as will be appreciated by those skilled in the art, the technology described herein can be, and is in an embodiment, used for providing plural output surface regions for display, and in an embodiment for providing each region of an output surface (e.g. frame) to be displayed to a display.

Equally, although the technology described herein is described above with particular reference to the processing of a given output surface for display, as will be appreciated by those skilled in the art, the technology described herein can be, and is in an embodiment, used for providing plural output surfaces for display, and in an embodiment for providing a sequence of output surfaces (e.g. frames) to be displayed to a display.

The various stages of the data processing system may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various processing stages of the technology described herein may be provided as separate circuit elements to one another. Additionally or alternatively, some or all of the stages may be at least partially formed of shared circuitry.

One or more of the various stages of the technology described herein may be operable to always carry out its function on any and all received surfaces. Additionally or alternatively, one of more of the stages may be operable to selectively carry out its function on the received surfaces, i.e. when desired and/or appropriate.

The data processing system may and in an embodiment does also comprise one or more of, and in an embodiment all of: a central processing unit, a graphics processing unit, a video processor (codec), a system bus, a memory controller, and additional elements as known to those skilled in the art.

The data processing system may be, and in an embodiment is, configured to communicate with one or more of (and the technology described herein also extends to an arrangement comprising one or more of): an external memory (e.g. via the memory controller), one or more local displays, and/or one or more external displays.

In an embodiment, the data processing system further comprises a or the display. The display that the display controller is used with may be any suitable and desired display, such as for example, a screen or a printer.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described with reference to the Figures.

FIG. 1 shows schematically a data processing system in accordance with an embodiment. The data processing system comprises a system on chip (SoC) 10 that it configured to provide image data to a display 20 via a display interface 30.

The system on chip 10 comprises a central processing unit (CPU) 11, a graphics processing unit (GPU) 12, a video processing unit (VPU), video engine or codec 13, a display controller 14, and a memory controller 15. The system on chip 10 could also comprise an image processor such as a composition engine and/or a camera image signal processor (ISP) (not shown), if desired.

As shown in FIG. 1, these communicate via an interconnect 16 and have access to off-chip main memory 40. The display controller 14 communicates with the display 20 via the display interface 30 so as to cause output frames (surfaces) to be displayed by the display 20.

The display 20 comprises an integrated display driver 21 and a display panel 22, e.g. that may be a liquid crystal display (LCD) panel, an organic light emitting diode (OLED) panel or otherwise. The integrated display driver 21 is operable to cause frames to be displayed on the display panel 22 via an internal interface 23.

In operation, a frame generator (e.g. the CPU 11, GPU 12, or video engine 13) generates a frame (surface) and stores it in main memory 40, e.g. in a frame buffer. One or more of these stored frames may be read from the memory 40 by the display controller 14, which optionally combines (e.g. composes) the read frames, and sends a frame for display to the display 20.

Although FIG. 1 illustrates an arrangement comprising a single display panel 22, it would be possible for the display 20 to comprise plural display panels. This may be the case, for example, for displays intended for virtual reality or augmented reality use. In this case, the display may comprise a left panel configured to be viewed by the left eye and a right panel configured to be viewed by the right eye.

Although FIG. 1 illustrates an arrangement whereby the display controller 14 provides output frame data to the display 20 via a single display interface 30, it would also be possible for the display controller 14 to provide data to the display 20 via plural display interfaces. This may be the case where the panel 22 has a particularly high resolution, and/or where the panel 22 is configured to display a pair of stereoscopic output surfaces. For example, the display 20 may receive data in respect the left image from the display controller 14 via a first display interface and may receive data in respect the right image from the display controller 14 via a second different display interface.

It would also or instead be possible for plural interfaces to be grouped together and to be effectively treated and used as a single interface.

Sending the data from the display controller 14 to the display 20 requires a significant amount of bandwidth. This is the case, for example, when 4K frames are sent to the display at 30 fps or 60 fps, and even more so for virtual reality (VR) or augmented reality (AR) applications, where it may be necessary to transfer a pair of 4K frames (i.e. one for each eye) at 90 fps or even 120 fps.

Accordingly, as shown in FIG. 1, the system on chip 10 of the present embodiment is configured to compress the frame for display, e.g. using a compressor 17, before it is sent to the display 20 for display. Correspondingly, the display 20 is configured to decompress compressed frames received from the display controller 14, e.g. using a decompressor 24 that is part of the integrated display driver 21. The integrated display driver 21 also comprises an integrated frame buffer 25 for storing the compressed data received from the display controller 14 and/or the decompressed data produced by the decompressor 24.

FIGS. 2-6 illustrate a number of different techniques that can be used to compress the image data that is sent from the display controller 14 to the display 20 via the display interface 30 in accordance with the technology described herein. The compressor 17 and decompressor 24 can optionally also use Display Stream Compression (DSC) to compress the data that is sent from the display controller 14 to the display 20.

Figure 2A:
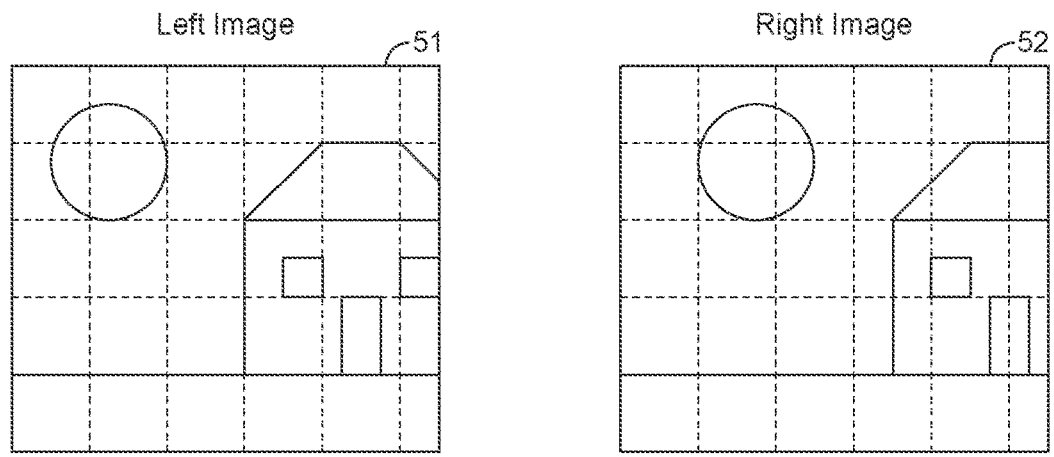
FIGS. 2A, 2B and 2C show schematically a left and a right image of a stereoscopic frame and techniques for their display.

FIG. 2A shows an example of a pair of virtual reality (VR) or augmented reality (AR) stereoscopic images that may be generated by the system on chip 10 for display.

Figure 2B:
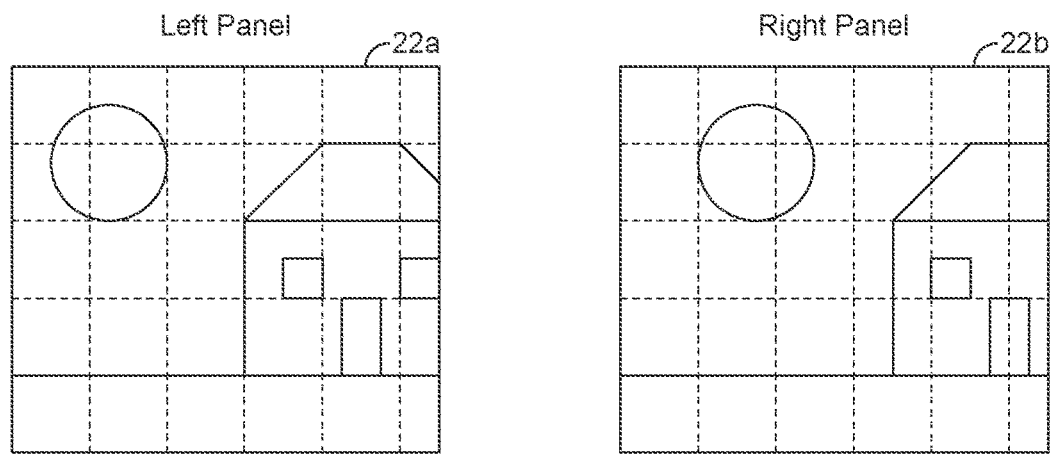
Figure 2C:
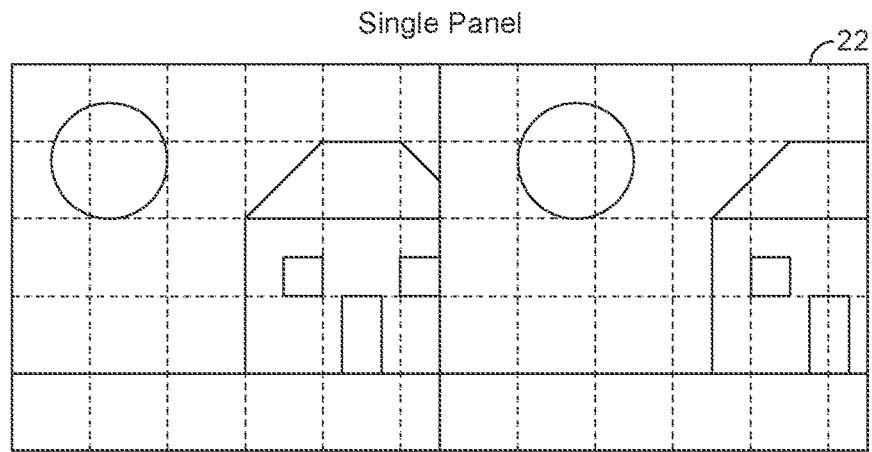

A left image 51 and a right image 52 are generated by the system on chip 10, and sent by the display controller 14 to the display 20. The left image 51 and the right image 52 are configured to produce the impression of a three dimensional image when respective images are viewed by respective eyes. As shown in FIGS. 2B and 2C, the pair of images may be provided to respective eyes using respective left 22a and right 22b display panels (FIG. 2B), or using a single display panel 22 (FIG. 2C).

Figure 3:
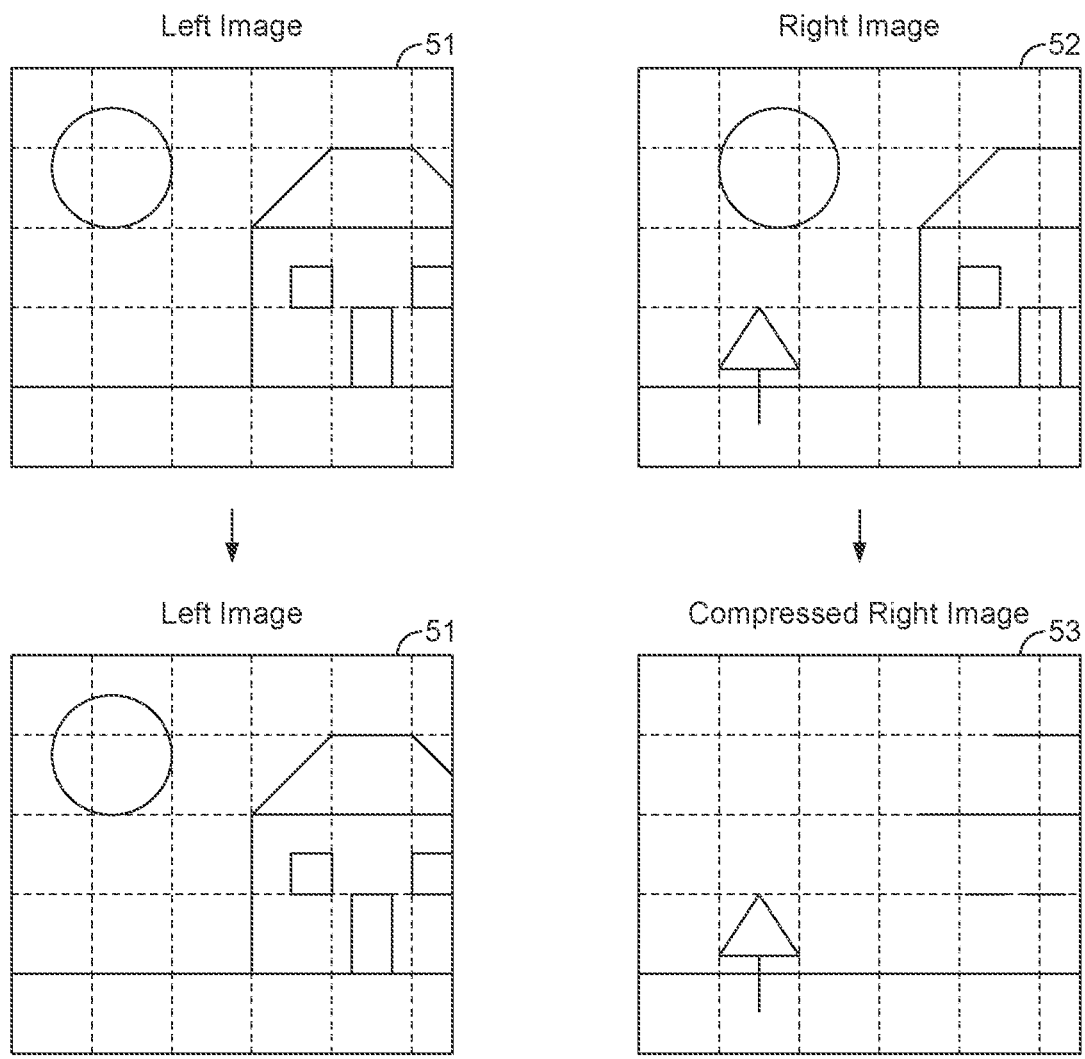
FIG. 3 shows schematically a left and a right image of a stereoscopic frame and a compressed version of the stereoscopic frame that may be used in accordance with an embodiment of the technology described herein.

FIG. 3 illustrates a method for compressing a pair of virtual reality (VR) or augmented reality (AR) stereoscopic images 51, 52. The left 51 and right 52 images are compared, and difference information 53 is generated that indicates the difference between the data values of the left and right images on the basis of the comparison. The difference information 53 comprises an array of difference ("delta") values or delta and offset values.

In this latter case, an offset value may be configured to take into account the interocular distance. Since the left 51 and right 52 images of a pair of stereoscopic output frames are typically very similar except that they are shifted by a relatively small distance relative to one another (that depends on the interocular distance), the difference information 53 could be determined by comparing the left image 51 to a version of the right image 52 that has been shifted by an offset distance that takes into account the interocular distance (or vice versa).

The images that are compared in this manner will be more similar than would otherwise be the case, and so this arrangement can have the effect of reducing the size of the difference information 53, and therefore further reducing the bandwidth and power requirements of the system.

The display controller 14 then sends image data in respect of one of the images to the display 20 together with the difference information 53. As shown in FIG. 3, this may be the image data of the left image 51 and the difference information 53, but it would also be possible to send the image data of the right image 52 and difference information.

The display's decompressor 24 is then operable to decompress the received data, and to combine the image data 51 with the difference 53 to reconstruct the (e.g.) right image 52. The display 20 then causes the, e.g. left 51, image data to be displayed together with the reconstructed right image data.

The Applicants have found that since in VR and AR applications, the left 51 and right 52 images are often similar, providing at least some of the data to the display 20 in the form of difference information 53, can significantly reduce the bandwidth cost of sending the data from the display controller 14 to the display 20.

The data in respect of the left 51 and right 52 images can be provided to the display 20 separately over different display interfaces. In this case, the right image 52 can be reconstructed using the image data for the left image (or vice versa) provided from the display controller 14 via the other display interface.

Alternatively, the data in respect of the left 51 and right 52 images can be provided to the display 20 using a single display interface 30 by time division multiplexing the image data. In this case, the right image 52 can be reconstructed using the image data for the left image (or vice versa) which will be contained in the previous frame.

Alternatively, the data in respect of the left and rights images can be provided to the display 20 as a single combined image. In this case, the right image 52 can be reconstructed using the image data for the left image (or vice versa) provided via the display interface 30.

Figure 4:
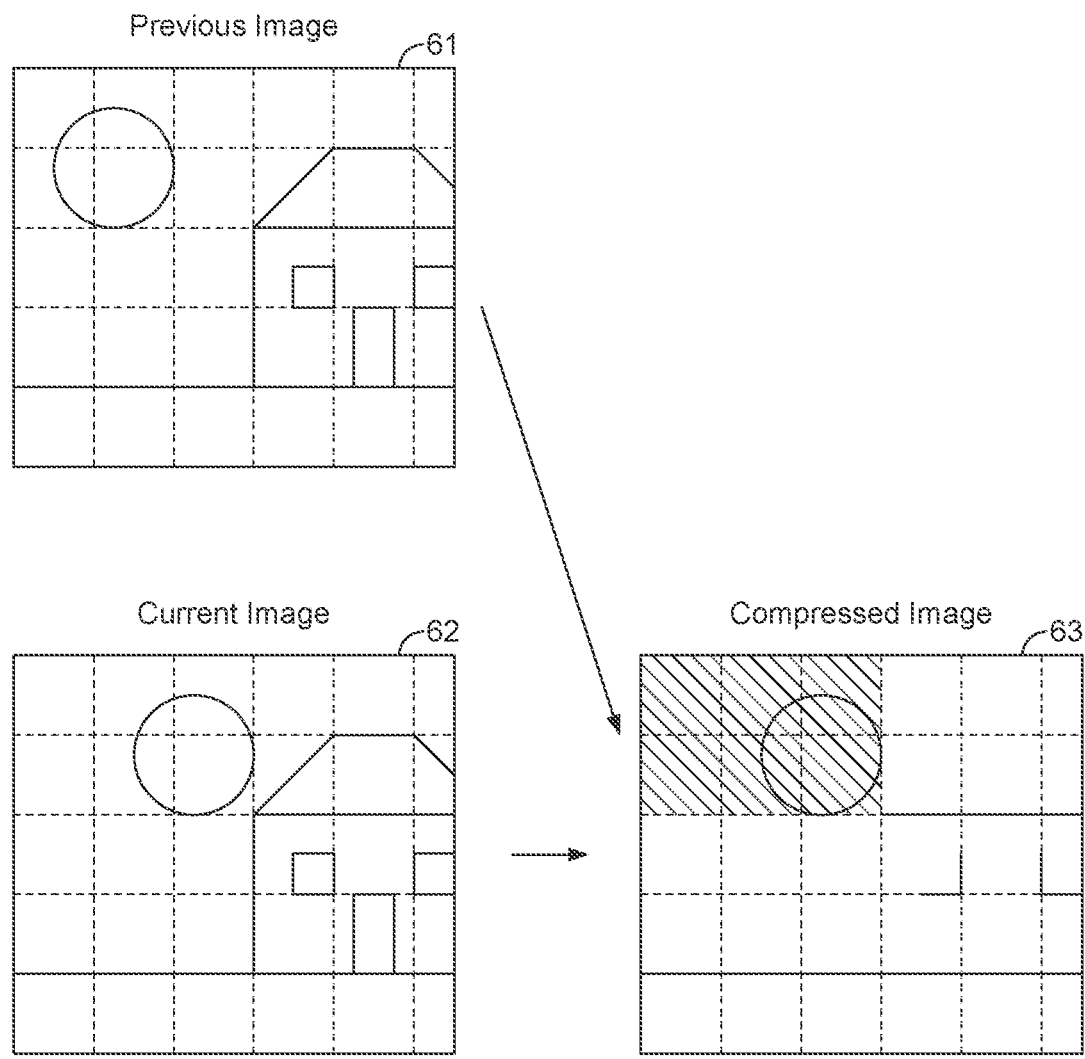
FIG. 4 shows schematically a previous and a current frame and a compressed version of the current frame that may be used in accordance with an embodiment of the technology described herein.

FIG. 4 illustrates a method for compressing a current frame 62 with respect to a previous frame 61 in a sequence of frames, in accordance with the technology described herein. In the present embodiment, the previous frame 61 comprises the frame that immediately precedes the current frame 62 in the sequence of frames, but it would be possible for the previous frame 61 to comprise an earlier frame in the sequence of frames.

The current frame 62 is compared with the previous frame 61, and difference information 63 is generated that indicates the difference between the data values of the current 62 and previous 61 frames on the basis of the comparison. The difference information 63 may comprise an array of "delta" values. The display controller 14 then sends the difference information 63 to the display 20.

The display's decompressor 24 is operable to decompress the received data 63, and to reconstruct the current frame 62 by combining the difference information 63 with image data of the previous frame 61 that it will already have access to, e.g. that may be stored in the display's frame buffer 25. The display 20 then causes the reconstructed current frame 62 to be displayed on the panel 22.

In this regard, the Applicants have found that it will often be the case that sequential frames are similar, and therefore that providing at least some of the data in respect of the current frame to the display 20 in the form of difference information 63 can significantly reduce the bandwidth cost of sending the data from the display controller 14 to the display 20.

In the present embodiment, the comparison process may be periodically disabled, and image data in respect of an entire frame (e.g. that does not use difference data) may be sent from the display controller 14 to the display 20. This can ensure that significant errors from the delta compression process do not build up over time.

This process can be performed periodically for the entire frame or for portions of the frame. For example, the comparison process may be periodically disabled for each of plural different regions of the frame, e.g. where the comparison process is disabled for different regions at different times. This has the effect of reducing peaks in bandwidth.

It would also or instead be possible to factor in the error from the previous frame when generating the current frame. For example, where errors in the delta and/or compression process are kept track of, these errors can be factored into the next/subsequent frames.

It would also be possible, where the difference between the current frame 62 and the previous frame 61 is relatively large (i.e. so that sending difference data 63 in place of the current frame 62 does not save bandwidth or saves relatively little bandwidth), to send the "full" image data in respect of the current frame 62 from the display controller 14 to the display 20 instead of the difference data 63.

Figure 5:
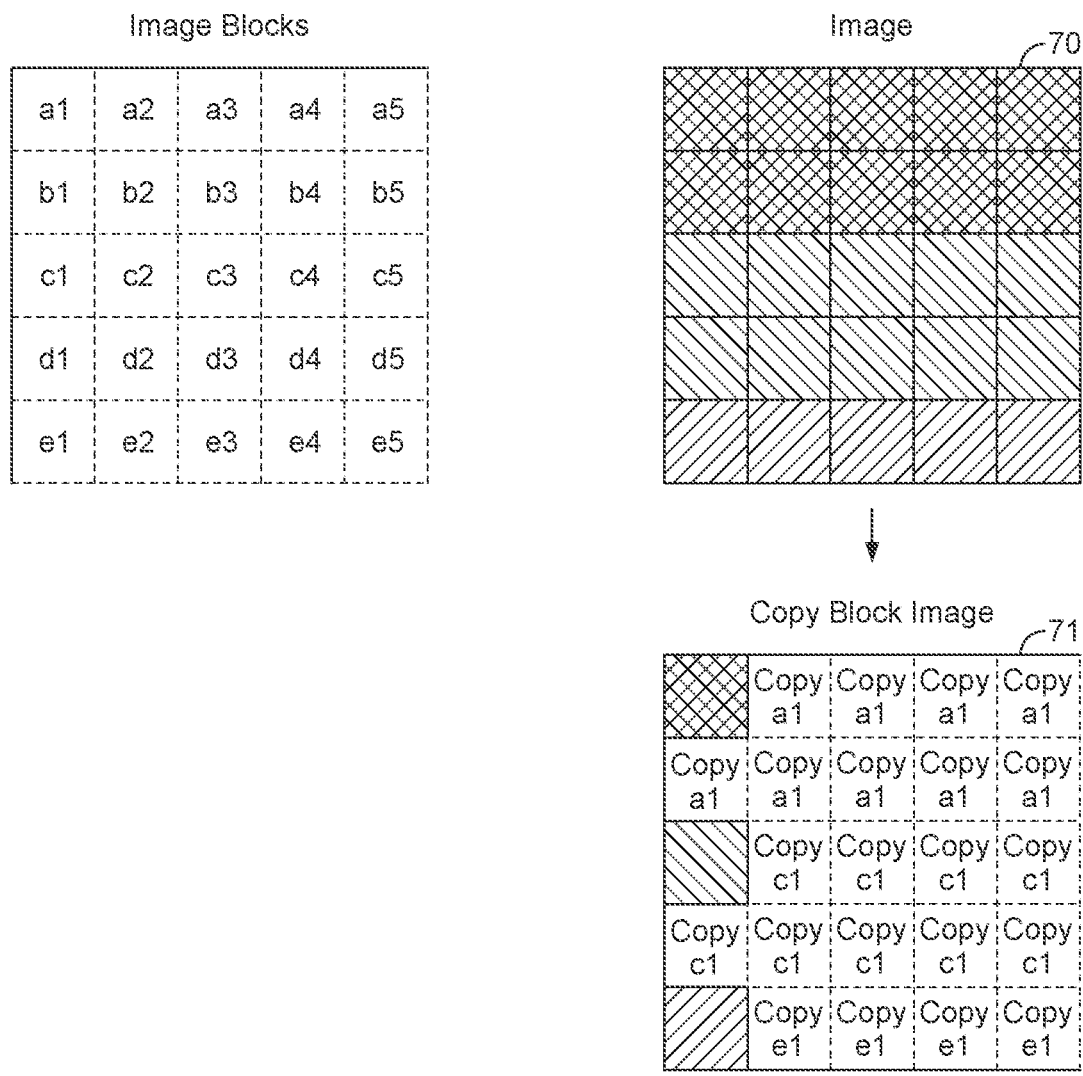
FIG. 5 shows schematically a frame and a compressed version of the frame that may be used in accordance with an embodiment of the technology described herein.

FIG. 5 illustrates a method for compressing an individual frame 70 in accordance with the technology described herein. In this case, the frame 70 is partitioned into an array of sub-regions or tiles (a1-e5). Each tile is compared to (at least) its two immediately adjacent previous tiles (i.e. the tiles immediately above and immediately to the left), so as to determine whether the tile is the same or sufficiently similar to a previous tile.

Where a particular tile is the same as (or sufficiently similar to) a previous tile, then data indicating this fact (e.g. "copy information") is sent to the display 20 in place of the actual image data. The display 20 then copies the previous tile's image data for the particular tile from the buffer 25 when producing the output frame for display.

FIG. 5 illustrates an exemplary frame 70, where tiles a1-b5 are the same (or similar), tiles c1-d5 are the same (or similar), and tiles e1-e5 are the same (or similar). In this case, instead of sending the entire image data 70 to the display 20, a compressed version is sent to the display 20 in the form of the image data of tiles a1, c1 and e1, together with information indicating that the image data for tile a1 should be used in respect of tiles a2-b5, the image data for tile c1 should be used in respect of tiles c2-d5, and the image data for tile e1 should be used in respect of tiles e2-e5.

In this regard, the Applicants have found that it can often be the case that tiles of an output frame are the same or similar, and therefore that providing at least some of the data in respect of an output frame to be displayed to the display in the form of similarity indicating information can significantly reduce the bandwidth cost of sending the data to the display.

Again, in this embodiment, the comparison process can be periodically disabled, and image data in respect of an entire frame (e.g. that does not use copy information) may be sent from the display controller 14 to the display 20. This can ensure that significant errors from the delta compression process do not build up over time.

In the present embodiment, the copy information operation can be made to be programmable in the display 20 and the Display Host can control the copy information operation through the Display interface.

In the present embodiment, the comparison can be performed by comparing signatures representative of the content of tiles. Suitable signatures would include standard CRCs, such as CRC32, or other forms of signature such as MD5, SHA 1, etc.

It would also be possible to use one or both of a signature (e.g. CRC) representative of the most significant bits (MSBs) of the content of each surface region and a signature (e.g. CRC) representative of the least significant bits (LSBs) of the content of each surface region.

Figure 6:
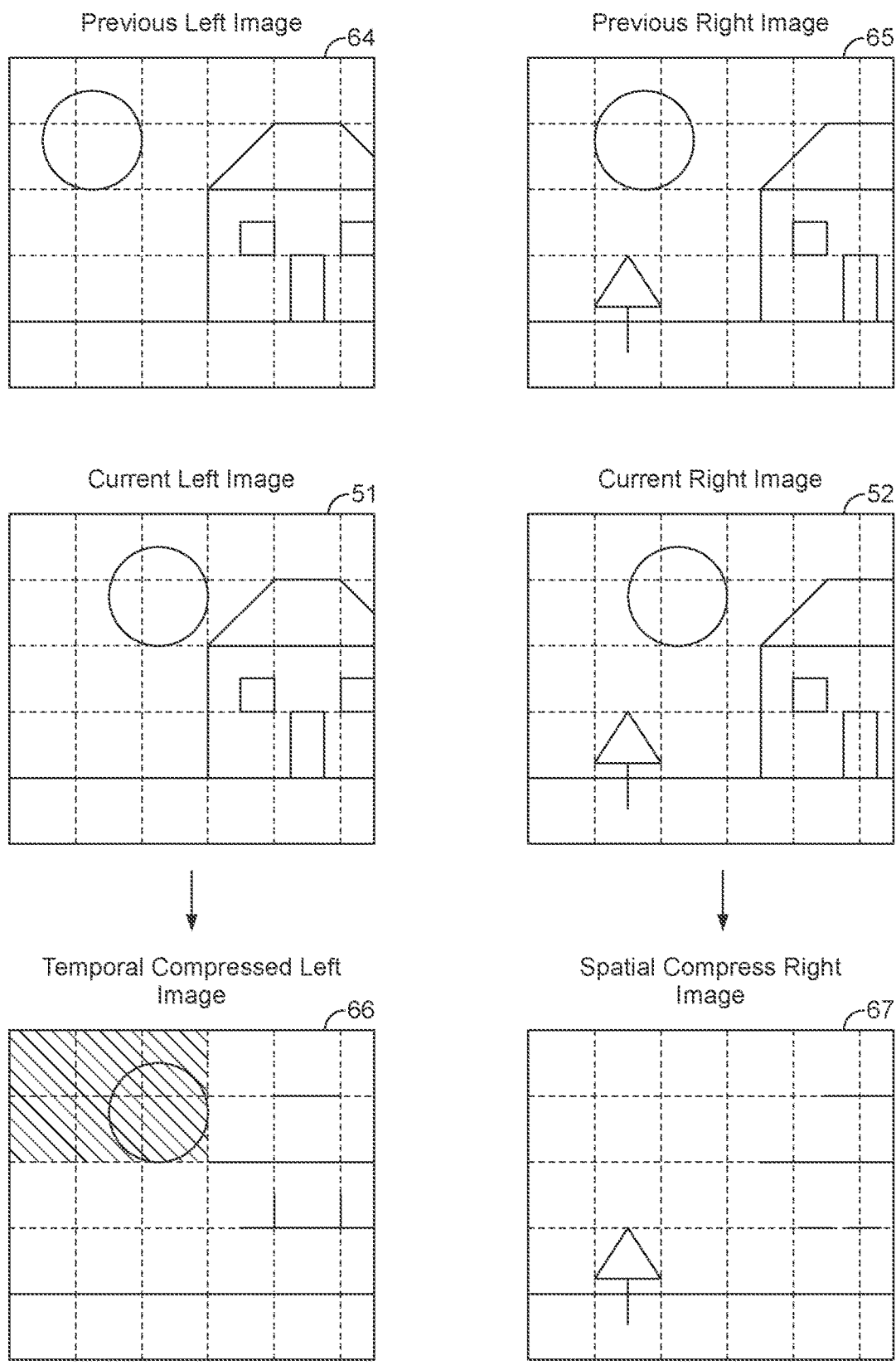
FIG. 6 shows schematically a previous stereoscopic frame and a current stereoscopic frame and a compressed version of the stereoscopic current frame that may be used in accordance with an embodiment of the technology described herein.

FIG. 6 illustrates a method for compressing a pair of virtual reality (VR) or augmented reality (AR) stereoscopic images 51, 52 with respect to a previous version of the pair of images 64, 65.

In this case, comparisons are made between the left image 51 of the current pair of images and the previous version of the left image 64, and between the right image 52 of the pair of images and the previous version of the right image 65. First 66 and second 67 arrays of "delta" values or delta offset values, e.g. as described above, are generated on the basis of the comparison that receptively indicate the difference between the data values of the current and previous right images, and between the data values of the current and previous left images.

The display controller 14 then sends the difference information 66, 67 to the display 20, and the display reconstructs the current left and rights images by combining the difference information 66, 67 with image data for the previous left and right images 64, 65, e.g. that is stored in the display's frame buffer 25. The display 20 then causes the current left and rights images to be displayed on the panel 22.

In the above embodiments, the similarity and/or difference information can be generated by the CPU 11 or the GPU 12. This involves the CPU 11 or GPU 12 reading in data in respect of the frames or frame regions to be compared, e.g. from the main memory 40, comparing the frames or frame regions and writing the (optionally compressed) similarity and/or difference information to the memory 40. The display controller 14 then reads the similarity and/or difference data from the memory 40 and sends it to the display 20.

An alternative arrangement is for the display controller 14 to generate the similarity and/or difference information. This involves the display controller 14 reading in data in respect of the frames or frame regions to be compared, e.g. from the main memory 40, comparing the frames or frame regions and sending the (optionally compressed) similarity and/or difference information directly to the display 20 via the display interface 30. This arrangement beneficially means that it is not necessary to write the similarity and/or difference information to (or read it from) the memory 40, thereby reducing bandwidth and power.

Figure 7:
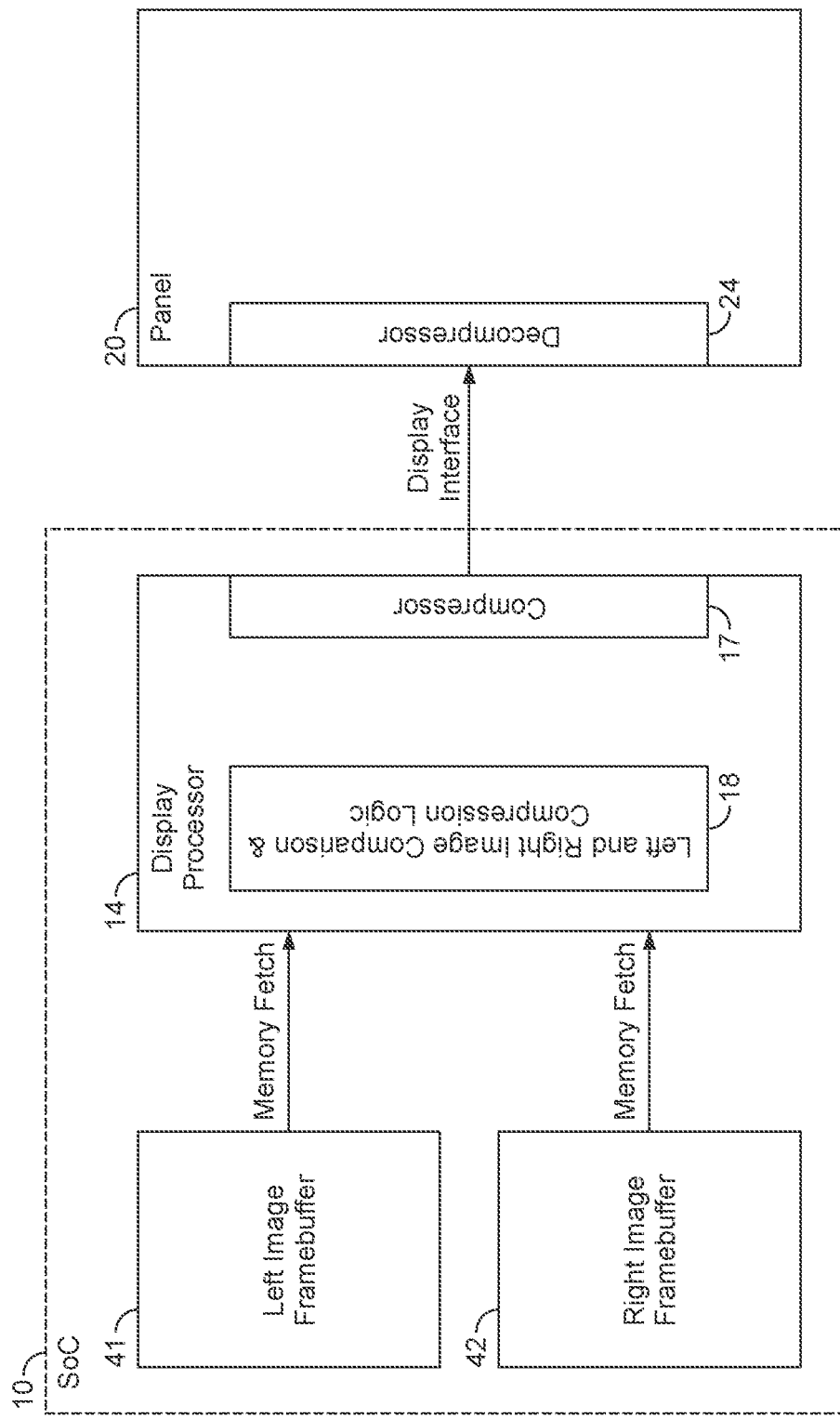
FIG. 7 shows schematically the operation of a data processing system in accordance with an embodiment of the technology described herein.

FIG. 7 illustrates such an arrangement where a pair stereoscopic images is to be displayed. As shown in FIG. 7, the display controller 14 fetches the left and right image data from respective frame buffers 41, 42, compares the images so as to generate difference data using comparison logic 18, and then sends the (optionally DSC compressed 17) difference data to the display 20 via the display interface 30.

In this arrangement, it is generally necessary for the display controller 14 to read in both frames or both frame regions to be compared for the comparison operation.

In an alternative arrangement, the video engine 13 is configured to generate the difference data. This involves the video engine 13 reading in data in respect of the current 62 and the previous 61 frame, e.g. from the main memory 40, comparing the frames and writing the (optionally compressed) difference information 63 to the memory 40. The display controller 14 then reads the difference data 63 from the memory 40 and sends it to the display 20 via the display interface 30. However, since the video engine's 13 normal decoding (motion compensation) operation involves reading in data in respect of both the current 62 and the previous 61 frame, these read operations can be reused to reduce the bandwidth and power cost of the comparison.

Figure 8:
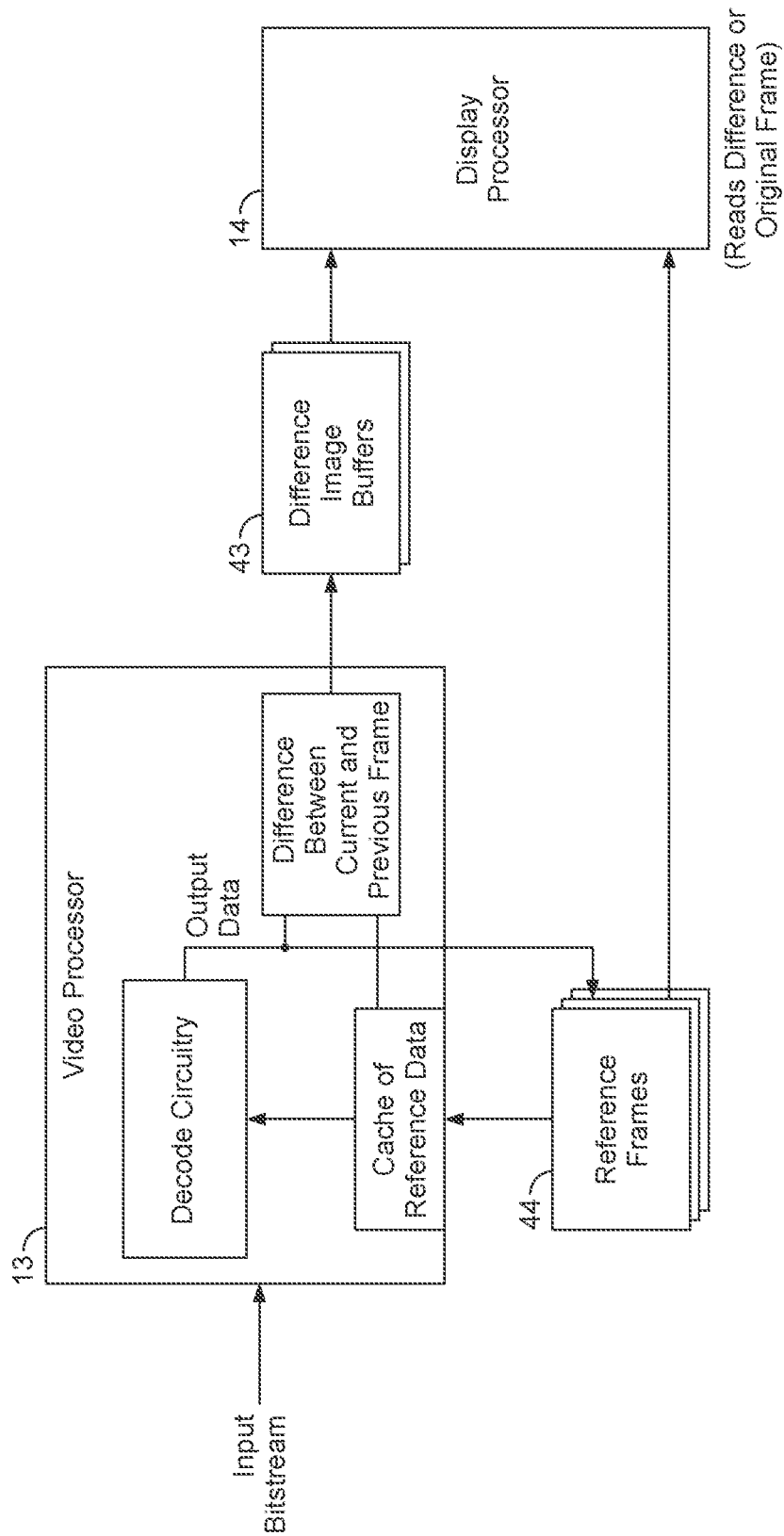
FIG. 8 shows schematically the operation of a data processing system in accordance with an embodiment of the technology described herein.

This arrangement is illustrated by FIG. 8. As shown in FIG. 8, the video processor is configured to output difference data to a difference image buffer 43 in addition to its normal decoding operation, i.e. in addition to outputting reference frames 44.

In the present embodiment, where the difference data is compressed, e.g. AFBC compressed, if the compression rate is relatively low, the system can stop generating the difference information for the next frame, and the full frame image data can be sent to the display instead or difference data.

It would also or alternatively be possible only to generate difference data for inter (motion predicted) frames, e.g. as indicated by the video bitstream.

Figure 9:
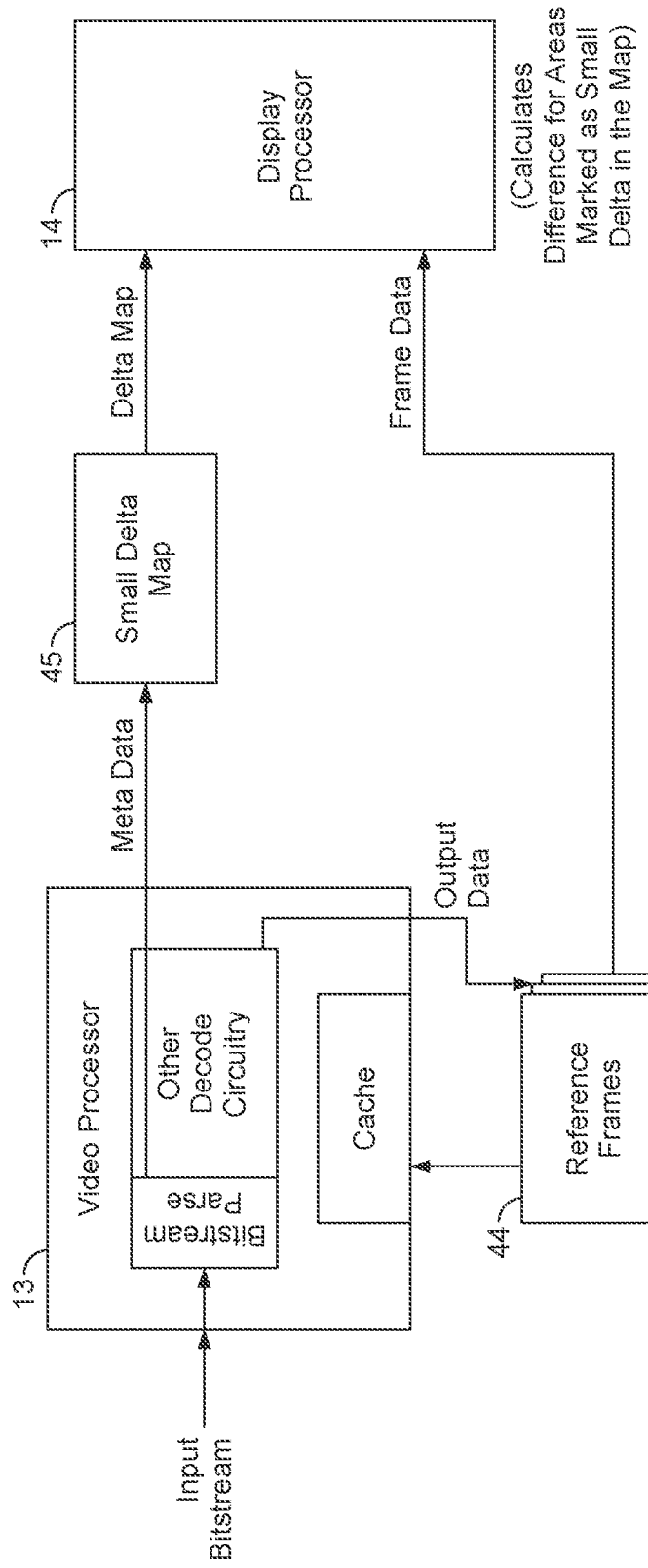
FIG. 9 shows schematically the operation of a data processing system in accordance with an embodiment of the technology described herein.

FIG. 9 illustrates an embodiment whereby the video engine 13 is configured to output information 45 indicating when it is profitable for the display controller 14 to calculate and provide difference information to the display 20.

In this case, the video engine 13 can use information provided at decode time (such as motion vector and transform residual magnitude, etc.) to determine which areas of the frame have small differences, and so would be profitable to encode and send to the display 20 as difference information. The video decoder 13 outputs sideband information 45 indicating which regions (e.g. which 64×64 tiles) would be profitable to be delta encoded.

The display processor 14 then uses this information to determine when to read data in respect of a previous frame as well as data in respect of the current frame, and to calculate the differences for transmission to the display 20. If the difference is known in advance to be small, this may also reduce the worst case bandwidth to the display 20 (since a delta value is in general one bit larger than the original value if the delta is not known to be small).

This arrangement can also be used in conjunction with frame reordering. Video frame data can be decoded in a different order from which is it displayed (for example B frame ordering). In these situations, the video engine 13 cannot provide a frame delta, but knowledge from the video decoder 13 of which frame areas have small differences can be used to indicate to the display processor 14 which areas it is profitable to read both the current and previous frames, and to calculate and transmit a delta frame.

For example, if it is known that a particular region has a small difference between decoded frames 0 and 1, and also between decoded frames 1 and 2, then even if the display order of the frames is 0, 2, and then 1, it can be deduce that there is a small difference between frames 0 and 2.

In the above embodiments, where signatures are generated for tiles, signature comparisons can be used to determine when to perform the comparison to generate difference and/or similarity indicating information. A signature comparison can be used as an initial relatively low-accuracy test to determine whether the regions are sufficiently similar such that it would be worthwhile for the data processing system to perform a "full" comparison operation to produce an array of difference ("delta") values.

The signature comparison can be made between the "full" signatures, e.g. CRC signatures, of the respective regions, or between signatures representative of lower resolution or lower precision versions of the respective regions. The signature of a lower resolution or lower precision version of a region could be the data value(s) of the region itself, e.g. if the version of the region has a sufficiently low resolution or precision. It would also be possible for the signature comparison to be made between only the signatures generated for the MSB bits of the respective regions' data.

It would also be possible to use an initial lower accuracy comparison, e.g. between signatures representative of the most significant bits (MSB s) of the content the respective regions, to determine whether or not to perform another (separate) more accurate comparison, e.g. between signatures representative of the least significant bits (LSBs) of the content of the respective regions.

In this case, where the MSB signatures are determined to be dissimilar (or insufficiently similar), then the region in question is provided to the display 20 in the form of image data. Where the MSB signatures are determined to be the same (or sufficiently similar), then the LSB signatures are compared to determine whether (or not) these signatures are the same (or sufficiently similar).

Where the LSB signatures are determined to be dissimilar (or insufficiently similar), then the region in question is compared to the other region to generate an array of difference ("delta") values, and this information is provided to the display 20. Where, on the other hand, the LSB signatures are determined to be the same (or sufficiently similar), then the region is provided to the display 20 using similarity indicating ("copy") information.

Although the above embodiments have been described in terms of providing difference and/or similarity indicating information to the display 20 for use in displaying a frame, the Applicants have additionally recognised that it would be possible to provide output surface data to the display in other forms.

In particular, where a pair of stereoscopic images is to be displayed by the display 20, data in respect of a single image can be provided to the display 20 together with depth data. In this case, the display 20 can use the image data and the depth data to reconstruct the pair of stereoscopic output images for display. This can again reduce the bandwidth cost of sending output surface data to the display 20, and accordingly means that the overall memory bandwidth and power requirements of the system can be reduced.

It can be seen from the above that embodiments of the technology described herein enables reduction of power and memory bandwidth consumption within a data processing system. This is achieved, in embodiments at least, by providing some or all of the data in respect of an output surface to be displayed to a display in the form of difference and/or similarity indicating information.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises:
   a display comprising a screen and processing circuitry;
   one or more display interfaces; and
   a display controller operable to provide data in respect of output surfaces to be displayed to the display via the one or more display interfaces;
   the method comprising:
   when a first output surface is to be displayed:
   comparing a region of the first output surface to another region of the first output surface or another region of a second output surface;
   generating information indicative of differences between data values of the region of the first output surface and corresponding data values of the other region on the basis of the comparison, wherein the difference indicating information comprises an array of difference values;
   the display controller sending the array of difference values through the one or more display interfaces to the display; and the processing circuitry of the display receiving the array of difference values from the one or more interfaces, using the array of difference values to produce a reconstructed output surface for display by applying the difference information to data for the other region, and causing the reconstructed output surface to be displayed on the screen.

2. The method of claim 1, wherein comparing the region of the first output surface to another region of the first output surface or another region of the second output surface comprises comparing the region of the first output surface to a region of the second output surface that is a previous version of the region of the first output surface.

3. The method of claim 1, wherein comparing the region of the first output surface to another region of the first output surface or another region of the second output surface comprises comparing a region of the left image of a pair of stereoscopic output surfaces to a region of the right image of the pair of stereoscopic output surfaces.

4. The method of claim 1, wherein comparing the region of the first output surface to another region of the first output surface or another region of the second output surface comprises comparing one or more sub-regions of the first output surface to one or more other sub-regions of the first output surface.

5. The method of claim 1, wherein the method comprises the display controller comparing the region of the first output surface to the other region and generating the difference indicating information.

6. The method of claim 1, wherein the data processing system further comprises a video engine, and wherein the method comprises the video engine comparing the region of the first output surface to the other region and generating the difference indicating information.

7. The method of claim 1, wherein the method comprises compressing the difference indicating information, and the data processing system selectively disabling the comparison of output surface regions based on a compression rate of the difference indicating information.

8. The method of claim 1, wherein the method comprises a video engine of the data processing system generating information indicative of the likelihood that a region will be similar to a previous version of the region, and the data processing system selectively disabling the comparison of output surface regions based on the information generated by the video engine.

9. The method of claim 1, wherein the method comprises comparing signatures representative of the content of the output surface regions, and the data processing system selectively disabling the comparison of output surface regions based on the comparison of the signatures.

10. The method of claim 1, wherein the method comprises the data processing system selectively disabling the comparison of output surface regions.

11. A method of operating a data processing system that comprises:
a display comprising a screen and processing circuitry;
one or more display interfaces; and
a display controller operable to provide data in respect of output surfaces to be displayed to the display via the one or more display interfaces;
the method comprising:
when a first output surface is to be displayed:
the display controller sending data in respect of the first output surface in the form of image data and image modification data through the one or more display interfaces to the display; and the processing circuitry of the display receiving the image data and image modification data from the one or more interfaces, using the image data and the image modification data to produce a reconstructed output surface for display by applying the image modification data to the image data, and causing the reconstructed output surface to be displayed on the screen;
wherein the image modification data comprises information indicative of a difference between a region of the first output surface and another region of the first output surface or another region of a second output surface, wherein the difference indicating information is indicative of differences between data values of the region of the first output surface and corresponding data values of the other region, and wherein the difference indicating information comprises an array of difference values.

12. A data processing system comprising:
a display comprising a screen and first processing circuitry;
one or more display interfaces;
a display controller operable to provide data in respect of output surfaces to be displayed to the display via the one or more display interfaces; and
second processing circuitry configured to: when a first output surface is to be displayed, compare a region of the first output surface to another region of the first output surface or another region of a second output surface, and to generate information indicative of differences between data values of the region of the first output surface and corresponding data values of the other region on the basis of the comparison, wherein the difference indicating information comprises an array of difference values;
wherein the display controller is configured to send the array of difference values through the one or more display interfaces to the display; and
wherein the first processing circuitry of the display is configured to receive the array of difference values from the one or more interfaces, to use the array of difference values to produce a reconstructed output surface for display by applying the difference information to data for the other region, and to cause the reconstructed output surface to be displayed on the screen.

13. The system of claim 12, wherein the data processing system is configured to compare the region of the first output surface to a region of the second output surface that is a previous version of the region of the first output surface.

14. The system of claim 12, wherein the data processing system is configured to compare a region of the left image of a pair of stereoscopic output surfaces to a region of the right image of the pair of stereoscopic output surfaces.

15. The system of claim 12, wherein the data processing system is configured to compare one or more sub-regions of the first output surface to one or more other sub-regions of the first output surface.

16. The system of claim 12, wherein the display controller is configured to compare the region of the first output surface to the other region and to generate the difference indicating information.

17. The system of claim 12, wherein the data processing system further comprises a video engine, and wherein the video engine is configured to compare the region of the first output surface to the other region and to generate the difference indicating information.

18. The system of claim 12, wherein the data processing system is configured to compress the difference indicating information, and selectively disable the comparison of output surface regions based on a compression rate of difference indicating information.

19. The system of claim 12, wherein the data processing system comprises a video engine configured to generate information indicative of the likelihood that a region will be similar to a previous version of the region, and wherein the data processing system is configured to selectively disable the comparison of output surface regions based on the information generated by the video engine.

20. The system of claim 12, wherein the data processing system is configured to compare signatures representative of the content of the output surface regions, and selectively disable the comparison of output surface regions based on the comparison of the signatures.

21. The system of claim 12, wherein the data processing system is configured to selectively disable the comparison of output surface regions.

22. A data processing system comprising:
    a display comprising a screen and processing circuitry;
    one or more display interfaces; and
    a display controller operable to provide data in respect of output surfaces to be displayed to the display via the one or more display interfaces;
    wherein the display controller is configured to: when a first output surface is to be displayed, send data in respect of the first output surface in the form of image data and image modification data through the one or more display interfaces to the display; and
    wherein the processing circuitry of the display is configured to receive the image data and image modification data from the one or more interfaces, to use the image data and the image modification data to produce a reconstructed output surface for display by applying the image modification data to the image data, and to cause the reconstructed output surface to be displayed on the screen;
    wherein the image modification data comprises information indicative of a difference between a region of the first output surface and another region of the first output surface or another region of a second output surface, wherein the difference indicating information is indicative of differences between data values of the region of the first output surface and corresponding data values of the other region, and wherein the difference indicating information comprises an array of difference values.

23. A non-transitory computer readable storage medium storing computer software code which when executing on a processor performs a method of operating a data processing system that comprises:
    a display comprising a screen and processing circuitry;
    one or more display interfaces; and
    a display controller operable to provide data in respect of output surfaces to be displayed to the display via the one or more display interfaces;
    the method comprising:
    when a first output surface is to be displayed:
    comparing a region of the first output surface to another region of the first output surface or another region of a second output surface;
    generating information indicative of a difference between data values of the region of the first output surface and corresponding data values of the other region on the basis of the comparison, wherein the difference indicating information comprises an array of difference values;
    the display controller sending the array of difference values through the one or more display interfaces to the display; and
    the processing circuitry of the display receiving the array of difference values from the one or more interfaces, using the array of difference values to produce a reconstructed output surface for display by applying the difference information to data for the other region, and causing the reconstructed output surface to be displayed on the screen.

\* \* \* \* \*